(12) United States Patent
Brubaker

(10) Patent No.: US 9,299,077 B2
(45) Date of Patent: Mar. 29, 2016

(54) METHOD AND APPARATUS FOR OBTAINING REVENUE FROM THE DISTRIBUTION OF HYPER-RELEVANT ADVERTISING THROUGH PERMISSIVE MIND READING, PROXIMITY ENCOUNTERS, AND DATABASE AGGREGATION

(75) Inventor: Curtis M. Brubaker, Monarch Beach, CA (US)

(73) Assignee: VIE, INC., Dana Point, CA (US)

( * ) Notice: Subject to any disclaimer, the term of this patent is extended or adjusted under 35 U.S.C. 154(b) by 52 days.

(21) Appl. No.: 11/552,932

(22) Filed: Oct. 25, 2006

(65) Prior Publication Data

US 2007/0112762 A1    May 17, 2007

Related U.S. Application Data

(60) Provisional application No. 60/729,919, filed on Oct. 25, 2005.

(51) Int. Cl.
*G06F 17/30* (2006.01)
*G06Q 30/02* (2012.01)

(52) U.S. Cl.
CPC .......... *G06Q 30/02* (2013.01); *G06F 17/30867* (2013.01)

(58) Field of Classification Search
USPC ............................................... 707/10, 5, 601
See application file for complete search history.

(56) References Cited

U.S. PATENT DOCUMENTS

| | | | |
|---|---|---|---|
| 6,128,624 A | 10/2000 | Papierniak et al. | |
| 6,594,640 B1 * | 7/2003 | Postrel | 705/14 |
| 6,883,000 B1 * | 4/2005 | Gropper | 707/10 |
| 2002/0120501 A1 | 8/2002 | Bell et al. | |
| 2003/0028889 A1 | 2/2003 | McCoskey et al. | |
| 2003/0134648 A1 | 7/2003 | Reed et al. | |
| 2004/0014486 A1 * | 1/2004 | Carlton | G06Q 30/02 455/550.1 |
| 2004/0068477 A1 * | 4/2004 | Gilmour et al. | 707/1 |
| 2004/0107125 A1 | 6/2004 | Guheen et al. | |
| 2005/0038876 A1 * | 2/2005 | Chaudhuri | 709/219 |
| 2005/0250552 A1 * | 11/2005 | Eagle et al. | 455/567 |
| 2006/0085419 A1 * | 4/2006 | Rosen | 707/9 |
| 2008/0133716 A1 * | 6/2008 | Rao et al. | 709/220 |
| 2008/0222127 A1 * | 9/2008 | Bergin | 707/5 |
| 2008/0306826 A1 * | 12/2008 | Kramer et al. | 705/14 |
| 2014/0016867 A1 | 1/2014 | Maurer | |

(Continued)

OTHER PUBLICATIONS

International search report dated Feb. 15, 2008 for PCT Application No. US06/60240.

*Primary Examiner* — Amresh Singh
(74) *Attorney, Agent, or Firm* — Wilson Sonsini Goodrich & Rosati

(57) ABSTRACT

A method and apparatus enabling the distribution of hyper-relevant advertising to consumers who have confirmed interests in specific content, products, and services is described. Users define "who they are" and "what they want" in a spontaneous, guided, voluntary disclosure of rich, candid, personal information conceived to attract individuals who seek or share common relationships, experiences, objectives, skills, knowledge, acquaintances, interests, needs, or desires for mutual gain. The information is converted into encrypted user codes; these codes are used to generate precisely controlled electronic encounters, the creation and delivery of highly personalized hyper-relevant advertising, and the gathering of amounts of research data through the ad hoc interaction of unique mobile devices.

25 Claims, 12 Drawing Sheets

(56) References Cited

U.S. PATENT DOCUMENTS

| | | |
|---|---|---|
| 2014/0188766 A1 | 7/2014 | Waldman |
| 2014/0188848 A1 | 7/2014 | Waldman |
| 2014/0189515 A1 | 7/2014 | Waldman |
| 2014/0189586 A1 | 7/2014 | Waldman |
| 2014/0189595 A1 | 7/2014 | Waldman |

* cited by examiner

METHOD AND APPARATUS FOR OBTAINING REVENUE FROM THE DISTRIBUTION OF HYPER-RELEVANT ADVERTISING THROUGH PERMISSIVE MIND READING, PROXIMITY ENCOUNTERS, AND DATABASE AGGREGATION

CROSS-REFERENCE TO RELATED APPLICATIONS

This application claims priority from U.S. provisional application Ser. No. 60/729,919 filed on Oct. 25, 2005, incorporated herein by reference in its entirety.

BACKGROUND OF THE INVENTION

1. Field of the Invention

This invention pertains generally to targeted advertising techniques, and more particularly to generating revenue through the delivery of hyper-relevant advertising to consumers having confirmed, verifiable interests in specific types of content, products or services.

2. Description of Related Art

The world of advertising has traditionally involved a process in which advertisers place the things they are trying to sell in the paths of consumers as they visit, gather, or pause out of need or desire; e.g., on passing roadside billboards, on free or paid television (referred to as first screens), on commercial radio, in restrooms, aboard public transportation, or on computer screens (called second screens) and now even on cell phone and PDA displays (termed by advertisers third screens). In most cases, this placement of content represents a relatively general or non-targeted presentation of merchandise or opportunities. As technology progresses however, we find we are able to deliver content to consumers more selectively since the technology they receive it on has increasingly greater abilities to tell us who is receiving and using it as well as where and when they are using it, along with feedback about their buying habits based on past performance. But never before have consumers had the ability to tell us precisely—either directly or indirectly—about the things they sincerely want, need or desire.

Modern society is comprised of numerous technologies which enable wireless mobile communications between friends, associates and others with whom it is necessary to exchange information. Most such technologies involve the use of specific telephone numbers, email addresses, computer codes, radio frequencies or similar means to enable links to specific people or groups of people for specific purposes.

The Internet is an example of a modern technology that demonstrates an exceptional ability to connect users who share common interests and objectives. Using a computer, a modem and appropriate software, Internet users can communicate with others who share mutual experiences, interests or objectives and often a desire to communicate more directly for a common purpose. Once such Internet users exchange adequate information, they may offer the other party or parties their phone numbers, email addresses, or other kinds of information that will ultimately lead to a mutually desired physical encounter or some similar transaction in the real world.

Each month in the real world, however, we may pass within close physical proximity of hundreds, or perhaps thousands, of individuals who share, to varying degrees, our precise and identical or similar most intimate, interests, experiences or objectives. However, we are never aware of these close encounters and are thus unable to take advantage of them as personal contacts or life enhancing opportunities.

Limited "systems" exist to permit spontaneous real world encounters. Typically, these systems use established networks and complex mobile devices in order to function, for example, cellular telephones and the cellular telephone system. Toothing, Serendipity, BEDD and Dodgeball.com are varied examples of such systems.

Toothing, also called "bluejacking", first emerged in the United Kingdom as a method of obtaining anonymous sex with strangers. Both terms derive from the word Bluetooth, the formal name given to a wireless radio technology standard designed to communicate over short distances (approximately 10 meters or yards) with cell phones, PDA's and similar Bluetooth equipped devices. Toothing usually begins when one party broadcasts a general wireless message requesting an encounter, hoping the message is received by another Bluetooth user, if there are any within range. If such a message is received and the other party is interested, information is exchanged until a suitable location for an encounter is agreed upon. Toothing involves no sophistication in locating or assessing potential users, other than human judgment on the part of each user, and an expensive cellular device which is Bluetooth capable. Such chance encounters are emotional, potentially risky, and are based on protocols that are created very much "in the moment."

BEDD is a Singapore based software and service company that allows its subscribers to send and receive information directly between their mobile phones. As with Toothing, BEDD software relies on Bluetooth equipped cellular telephones that permit the transmission of voice and data via short range radio. To use BEDD, a user must manually input all of his pertinent profile data (age, gender, special hobbies or interests) into his cellular phone. When BEDD phones are on, they automatically search for other BEDD-enabled phones within range (typically a 30 foot radius) and once radio contact is made, they exchange profiles and contact information. The BEDD service can accommodate most cell providers but it does not use online servers, system managers or databases. BEDD, therefore, has limited capacity and is unable to deliver extensive data or transmit photos.

Serendipity is a more exacting mobile application for proximity encounters. Developed by MIT's Media Lab., Serendipity also uses Bluetooth technology and the cellular system to communicate with a remote computer, but then adds a central server, a system manager and a database. In the field, Serendipity creates a 16 foot transmission "bubble" around each Serendipity user that broadcasts a unique ID. When two or more individuals using Serendipity enter the bubble, their ID's are sent via the cellular network to Serendipity's central server, which looks at the personality profiles stored for each member user. If the Serendipity computer determines a compatible match exists within its stored profiles, each user then gets the other's name, a thumbnail photo and a list of common interests transmitted through his or her cell phone. The server scans for IDs every 60 seconds and the entire sequence takes about a minute, assuming the cellular system is working.

In the United States, Dodgeball.com, a free system which does not use Bluetooth, lets its subscribers find friends within a 10-block area by sending a text message with his or her location to Dodgeball. The Dodgeball server then relays the message to the user's selected list of friends. Dodgeball will also notify a user of any friends, or friends-of-friends, who are within the 10-block range. It is quite nonspecific.

Today there are countless independent Internet services comprised of public, proprietary, and personal data, which is contributed or managed by individuals, members or the public at large. On some sites members pay a monthly fee for the right to post data, which can then be accessed or shared by other paying members. Online Personals and Dating, for example, led the Internet paid database category in the U.S. for 2003, accounting for 28.8% of all paid content, or roughly $450 million in consumer spending. In 2004, this number increased to $475 million. Growth over the next five years, however, has been projected to slow (rising only 32% to $623 million) due to the increasing numbers of competing Online/Personal services. Market saturation in such databases suggests that a novel system which would enable customers to access considerably larger or multiple databases simultaneously could produce more exacting match-ups over less time, thereby significantly increasing customer satisfaction at a much lower cost.

Another popular use of the Internet involves the downloading of music and similar forms of digital entertainment and information. One such early enterprise, Napster, allowed members to download music without charge, as long as users contributed music to the Napster database. Such sites and uses were ultimately deemed illegal because they did not provide for the payment of royalties to the original content creators as is done with traditional forms of Intellectual Property distribution. If such systems are to succeed, fair and proper compensation must be made to those creating Intellectual Property and to those who own, operate, and maintain sites which distribute it.

More recently, Apple Computer negotiated with various major music labels and successfully licensed hundreds of thousands of songs for its itunes Music Store online database. This music is downloaded legally by consumers for a fee. Purchased itunes music can then be transferred from a user's computer to itunes-compatible devices. An iPod is an example of a portable MPEG audio device that is itunes-compatible. The iPod allows users to play their purchased content (e.g., music or video) as many times as they wish on their iPods, however software access keys prevent the transfer of purchased music to other iPods in order to assure the compensation of Intellectual Property rights. iTunes then pays the owners of these properties a royalty based on its distribution and sales. Apple permits users to select from a menu of commercial entertainment which is traditionally available through other suppliers and through alternate distribution methods. The data is public in nature, as opposed to private or confidential. It is data that is previously known to and recognized by Apple's music (or video) customers. iTunes further permits its customers to sample the data before they buy and download it. Once downloaded, the customer has unlimited use of the data he has purchased, except he cannot duplicate purchased video onto DVDs. Throughout, the process of sampling, selection, purchase, and use is entirely controlled by the consumer. In other words, Apple delivers a specifically ordered product whose content is known to the user/subscriber in a single traditional buyer/seller direct transaction. iPods do not, however, enable wireless communications.

By the end of 2008, Bluetooth-equipped mobile phones are expected to have penetrated 60% of the mobile phone market. This is leading to an ever increasing need to wirelessly distribute overwhelming amounts of data between mobile devices in the field. This process can consume tremendous amounts of transmission bandwidth and can increase the risk of inadvertent or deliberate pirating of data through wireless intervention.

Of practical importance, when such communications are intended to produce physical encounters in the field, they can also result in significant interruptions or distractions to thousands of users throughout the day. It is therefore incumbent upon database owners and operators—and critical to the users and subscribers of proximity encounter systems or devices—that they optimize the quality, rather than the quantity of their encounters so that these become useful and rewarding experiences, rather than draining on a user's valuable time.

BRIEF SUMMARY OF THE INVENTION

The present invention, referred to herein as MMx, provides consumers with the ability to tell us precisely—either directly or indirectly—about the things they sincerely want, need, or desire. In general terms, MMx provides this capability by flipping the conventional advertising model inside out.

By way of example, and not of limitation, MMx employs voluntarily completed user profiles which reveal exactly "who users are" (also referred to herein as "who I am" or "WIA") and "what users want" (also referred to herein as "what I want" or "WIW"). These profiles are used for the purpose of enabling specific kinds of personal electronic encounters. These profiles are also used to reveal information to marketers regarding specific user interests and needs, so that the marketers can creatively respond by offering opportunities to specific consumers that precisely match the interests and needs of the consumer. It will be appreciated that consumers often object to traditional advertising because ads interfere with their normal pastimes or forms of entertainment. Consumers further object to ads and commercials because the ads and commercials do not always present products and services which are of personal interest to the consumer. Yet, tests have shown that most consumers respond positively to advertising which relates to their lifestyles and to the things they truly care about. Children, especially, watch TV commercials when those commercials are relevant to their lives and interests. Thus, at the same time MMx users define themselves and their desires to for the purpose of electronic encounters, they inform advertisers about the kinds of things they'd like to see, hear, or be presented in terms of products, services and lifestyle experiences.

The present invention thus enables a method, apparatus and business model for identifying such unexpected, potential contact opportunities, for assessing these opportunities to assure absolute compatibility with one's own changing personal objectives, and for converting this information into spontaneous, controlled, on the spot physical encounters. Additionally and importantly, the present invention offers a means to optimize the depth and quality of such encounters through deep and exacting screening and through the aggregation of numerous independently owned and operated databases to provide its users with the largest possible selection, and therefore the highest quality, of encounter possibilities conforming to their precise specifications in the least amount of time. In practice, this technology also enables a novel method of collecting, interpreting, and compiling vast amounts of information on user interests, backgrounds, desires, and needs relative to the times, places, and ways consumers move about and spend their time. From this, commercial advertisers can create and deliver ads that are highly personalized and demographically "hyper-relevant." Such ad content can also be distributed to individual MMx units within its network, and to traditional established independent systems including commercial television and appropriately-equipped transportation vehicles or stationary objects.

Presenting hyper-relevant information is not mere "targeting". Targeting is the display of information to a demographic, or group of users, that is "likely to be interested" in the information. The presentation of hyper-relevant information is the presentation of information to a specific user that is "requested" by that user. The "request" is contained in the "WHO I AM" and "WHAT I WANT" profiles that are completed by that user, and in the internal relationships between the data that exist within those profiles.

More particularly, the present invention generates revenue through the delivery of hyper-relevant advertising to consumers having confirmed, verifiable interests in specific types of content, products, or services. This involves the production and distribution of low-cost, passive, infrastructure-free, personal handheld mobile devices which enable consumer-driven electronic encounters. Through such production and distribution, a controlling company is able to motivate and secure highly-detailed, voluntary user profiles. The company then discreetly uses these profiles to, for example, (i) create or enable unique online communities, (ii) deliver life-enhancing electronic encounters, (iii) manage and aggregate social networks, (iv) passively confirm the delivery of advertising content and consumer engagement, (v) drive lucrative platforms for the distribution of hyper-relevant advertising, and (vi) engage in the widespread passive, spontaneous acquisition of data relating to the interests, habits and preferences of consumers as they go about their daily lives.

The term "Permissive Mind Reading" is defined herein as the voluntary disclosure of rich, candid, privately-held, personal information (in numerous types and forms) between individuals by escalated mutual agreement. This is accomplished, in part, through the adoption of dedicated proximity communications and the aggregation of new and established databases. The present invention thus permits the controlled, secure, self-identification of an individual user, the identification of a user's specific objectives or needs, the encoding and encryption of this information when appropriate, the aggregation of as many databases as possible relating to those objectives or needs, and the deployment of non-network mobile devices for the spontaneous, measured disclosure of pre-matched encoded information sufficient to enable mutually agreeable, in-field physical encounters and other life experiences.

The present invention provides a basic and simple means for describing one's own persona and character in detail, including personal interests, experiences, knowledge, professional skills, acquaintances and similar information in a rich, intimate, yet standardized, format. The present invention also provides a means to define that person's specific objectives, wishes, or needs. When combined, these form the basis for mutual disclosures to select second and third parties for mutual gain. In other words, according to one aspect of the invention, this is akin to being granted permission to "look into" another's mind, to initially sample their innermost thoughts and desires in specific, personally-authorized realms in an effort to determine whether sufficient reasons exist for the parties to mutually explore further communications. If those reasons exist, communications between the parties then escalate in stages, leading ultimately to an opportunity for a physical encounter, usually within the proximity contact venue.

Another aspect of the invention is deployment of dedicated mobile devices and the simultaneous creation and aggregation of competing, participating databases to produce unique consumer experiences, enhanced database performance, and financial gain through compensation to the database owners and operators involved. Still another aspect of the invention is provision of a means and network through which commercial advertisers can purchase non-identifiable, encrypted user codes for the purpose of creating and delivering unique ad content to specific users and user types without violating user security, confidentiality, or commonly accepted privacy laws. This experience is in many ways a melding of minds, minds that either share or wish to share common thoughts, feelings, and information for mutual gain. The method and apparatus is thus referred to herein as a mind-melding experience or "MMx".

A further aspect of the invention is a method and apparatus enabling the distribution of hyper-relevant advertising to consumers who have confirmed interests in specific content, products, and services. The invention allows users to first define "who they are" and "what they want" in a spontaneous, guided, voluntary disclosure of rich, candid, personal information conceived to attract individuals who seek or share common relationships, experiences, objectives, skills, knowledge, acquaintances, interests, needs, or desires for mutual gain. It next converts this information into encrypted user codes and permits those codes to be applied in a novel way to generate precisely controlled electronic encounters, the creation and delivery of highly personalized targeted advertising, and the gathering of massive amounts of research data through the ad hoc interaction of unique mobile devices. The technology deploys a multiplicity of dedicated, passive, independently-operated proximity computing devices that intercommunicate to discreetly broadcast, gather, and release data from competing or non-competing database platforms, thereby aggregating said platforms to deliver the largest possible selection, and therefore the highest quality, of encounter possibilities conforming to a consumer's precise specifications within the least amount of time.

Still another aspect of the invention is a business model that enables database owners to realize increased revenue from their existing users by adding the capacity for wireless encounters without incurring significant capital costs or changes to their current systems while it preserves the unique and proprietary formats, themes, and rights of participating database owner/operators for the benefit of their users. The invention provides, according to another aspect, a method and apparatus for commercial advertising, military, scientific, public service and personal applications comprised of an Internet component, together with a mobile communications component, that includes a wireless transceiver for communicating with similar mobile or stationary devices; a portable means for data storage and display, a means for downloading, encoding, encrypting, and disseminating personal and confidential information, a protocol for wirelessly decoding and disclosing that information; and a method of compensating participating database owners for the use of their data. The system further comprises a means for anticipating user travel, for non-invasively tracking user movements by area, time, personal interests and demographic groupings for the purpose of collecting, analyzing and documenting such information to enable rewarding physical encounters, compelling advertising experiences and a rich new resource for market researchers, planners and developers.

It is the general object of this invention to provide a system and method for enabling spontaneous proximity encounters worldwide by alerting users when there are individuals in their immediate vicinities who share common interests, skills, experiences or objectives; to determine when such individuals might be receptive to physical encounters; to enable a safe, easy method for assessing encounters before they occur; to intelligently escalate said encounters electronically and to ultimately facilitate those encounters physically; or alternatively, to suspend or terminate such encounters and/or record them for future use.

It is a further general object of this invention to optimize the general quality of proximity encounters by exposing users to the greatest number of potential encounter candidates on multiple databases, yet accomplish this by permitting users to join, or become a paid member of, only a single such database.

It is a further general object of this invention to enable spontaneous, unanticipated proximity encounters anywhere in the world, in the absence of mobile telecommunications infrastructures such as cellular telephones.

It is a further general object of this invention to enable a means for consumers to structure their own safe, escalating encounter protocols which can be selected and predetermined by each individual user.

It is a further general object of this invention to provide an easy to use, two part profiling process through which users can simply define "who they are" and "what they want" and that this format be adaptable to nearly all foreseeable user situations.

It is a further general object of this invention to encode said profile responses into a non-identifiable format in which all data is encoded and all personal information is deleted from demographic or operational information for the security of its users.

It is a further general object of this invention to convert said non-identifiable formats into special interest user codes which enable secure electronic encounters and further to allow commercial advertisers to create and deliver highly personalized, demographically "hyper-relevant" advertising impressions to encounter customers.

It is a further general object of this invention to convert said non-identifiable formats into special interest user codes which enable commercial advertisers to create and distribute highly personalized, demographically hyper-relevant advertising impressions to personal- or privately-operated mobile or fixed hard drives and storage media to be displayed on demand or on cue to participating consumers.

It is a further general object of this invention to convert said non-identifiable formats into special interest user codes which enable commercial advertisers to distribute highly personalized, demographically hyper-relevant advertising impressions to a multiplicity of personal electronic storage devices each having the capacity to substitute targeted advertising for non-targeted advertising and, in turn, document and confirm all such content substitutions and deliveries.

It is a further general object of this invention to provide a means for the passive tracking of such special interest user codes through an inherent ad hoc wireless network resulting from the deployment of this invention in order to monitor the various user types, interests, travels, habits, and experiences without violating personal security or civil liberties.

It is a further general object of this invention to make such non-identifiable special interest codes available to advertisers and to other parties for the creation of demographically-targeted, location-specific commercial advertising and related services which can enhance the broader consumer experience.

It is a further general object of this invention to incorporate into its basic electronic encounters operating scenario a broadly-based means for tracking the travel and movement patterns of mobile users and to classify such information by time, place, demographic, psychographic, and other definitive means for the purposes of research.

It is a further general object of this invention to compile such information for the purposes of identifying user potential exposures to outdoor advertising, travel and traffic patterns, venue and visitation histories, including inactive periods, with the objective of documenting such information without requiring said users to perform extraordinary efforts or tasks related thereto.

It is a further general object of this invention to ensure that personal and proprietary information of participating database owner/operators and their members shall not be released, distributed, shared, commingled, sold, or otherwise offered to competing databases or to unauthorized consumers.

It is a further general object of this invention to assure that users will benefit by having cost effective access to multiple, often competing databases, however only under strict disclosure procedures and only during actual proximity encounters unless otherwise compensated for.

It is a further general object of this invention to provide financial gain to the owners or operators of any database which makes its content available for proximity encounters under this system.

It is a further general object of this invention to offer the owners or operators of participating databases a method of maintaining or enhancing their competitive positions by offering their subscribers a novel, companion wireless service which grants access to substantially greater numbers of candidate users and relevant information than they would find on any single database or on their "originating" database, and to accomplish this typically with financial gain to the originating database owner.

It is a further general object of this invention to enable the mass distribution of mobile proximity encounter devices FREE of charge within specific geographic areas or to special population segments in order to seed consumer use, introduce a unique service, build user databases, and garner brand allegiance.

It is a further general object of this invention to anticipate its integration or convergence with other types of mobile telecommunications devices or networks.

It is a further general object of this invention to facilitate a broad array of encounter types, from personals and dating, to transactional encounters for the purpose of buying and selling (especially where on the spot or spontaneous responses or exchanges are vital), to renewing or revealing personal acquaintances, alerting individuals to the potential for high-value or high-importance contacts with people, environments or situations that could prove either beneficial or harmful (such as revealing the presence of certain diseases, contaminants or conditions; certain individuals having criminal records or dangerous characteristics; individuals having specific skills, knowledge, aptitudes or equipment of extreme benefit to others such as employment, law enforcement or medical needs including emergencies); and numerous other applications which, due to shared interests, desires or needs enable individuals who would be otherwise unaware, to be brought into controlled personal contact with another.

It is a further general object of this invention to enable a passive component of the mobile product through which certain kinds of users can be automatically alerted to situations that may be hazardous to their personal health or well being (for example young children could be alerted to the presence of registered sex offenders, or to animals having a history of biting), such passive component producing a legally approved and recognized public safety alert or hazard warning.

It is a further general object of this invention to produce such exacting and secure information dissemination that it can be used in military and intelligence gathering applications worldwide.

It is a further general object of this invention to enable the remote activation and display of selected content on stationary video displays or on moving objects for the purpose of delivering hyper-relevant advertising, public service alerts or personal messaging.

It is a further general object of this invention to enable the remote activation of fixed or mobile video cameras or similar devices for the purpose of capturing and recording personal imagery in the vicinity of the present invention for use in the fields of entertainment, recreation, documentation or security.

It is a further general object of this invention to incorporate software that can automatically extract "relational events" from the inputs and use patterns of individual users to enable the automatic analytical processing and detection of trends, anomalies, patterns, preferences, and linkages, which will then suggest or deliver more satisfying, rewarding, or meaningful physical encounter experiences.

It is a further general object of this invention to provide an optional online service through which users can verify the accuracy of member profiles and user claims to the extent such information can be verified.

No current product, service or business model presently embodies these specific objectives and alternatives.

MMx Operating Model

According to one aspect of the invention, consumers and Internet users are introduced to the MMx invention through traditional advertising and media exposure. Such ads would first advise prospective users of a unique way to locate and communicate with other individuals who share similar interests, knowledge, desires, or objectives. Through such ads, consumers would be informed about the online service and the availability of mobile, personal encounter devices designed to enable encounters and would be told where they can buy them. Finally, users would be educated on the numerous online databases then linked, or soon to be linked, and aggregated by the MMx system, and would be further exposed to the positive lifestyle uses of MMx encounter devices in their daily lives.

According to another aspect of the invention, in cases where prospective MMx users already happen to be paid members of an Internet database (for example, a personal/dating site), consumers may be exposed to MMx advertising placed on that site and be given an opportunity to sign up for MMx services on the spot. In such cases, the database carrying the advertisement may become the sponsoring or "originating" database. New MMx members might pay an enrollment fee to the MMx enterprise as a result of viewing these ads. The MMx enterprise might, in turn, pay a percentage of any fees collected to the owner/operator of the originating database responsible for producing that customer. In exchange for the monthly subscription fees, the consumer is now entitled to continued access of his originating database as well as access to all of the participating databases which have been aggregated into the MMx system. Customers can use the search tools provided by the originating database to access their database as usual, or they may use the broader integrated MMx search protocols for all databases combined, based on the type and nature of the encounter or search desired.

According to a further aspect of the invention, in cases where prospective MMx customers are not already paid members of an Internet database, they may be exposed to MMx advertising through traditional advertising and promotional media (television, print, billboards, Internet, etc.) and be offered an opportunity to sign up for MMx services directly through the MMx enterprise. In such cases the MMx Enterprise itself would become the sponsoring or "originating" database. The MMx enterprise may then compensate any participating member databases on a per completed encounter basis and, in turn, bill its own direct customers. Consumers, in exchange for their single monthly fee, would be entitled to access the databases of all MMx aggregated systems using the integrated MMx search tools and protocols for the type and nature of encounter desired.

According to still another aspect of the invention, new users could purchase a mobile wireless MMx device, could subsequently be educated in the use of the invention and in the techniques of proximity encounters and would be advised that they now have access to multiple aggregated databases which significantly expand the quality of their encounter experiences.

According to a further aspect of the invention, every new member of the MMx database will first complete a detailed, structured "WHO I AM" master personal profile describing in detail his background, his character, qualities, capabilities, skills, experiences, acquaintances, interests, histories and the like, and submit this profile for approval and future use to the MMx Database System for conversion to a non-identifiable (NID) format in which the profile is not linked to any specific name, address, social security number, or other traditional forms of personal identification.

In accordance with another aspect of the invention, each new member of the MMx Database System would then, after completing his "WHO I AM" profile, complete his detailed general and specific personal "WHAT I WANT" profiles describing his long and short term personal objectives, needs, desires, and interests relating, when appropriate, any personal acquaintances, skills, talents, capabilities, information, and knowledge corresponding to those objectives using an MMx structured format. Users could, for example, describe in detail an item they might wish to own, an event they'd like to experience, the kind of person they'd like to meet or the kind of job they'd like to have, listing their experience and qualifications in that field. They would then submit these profiles to the MMx Database System in a non-identifiable (NID) format for approval and future use.

According to another aspect of the invention, MMx software next analyzes each member's NID formatted profiles, applying proprietary processing to extract hidden meanings and establish relational elements within the free form text of each member's structured and unstructured responses to structured MMx questions. MMx software then interprets each member's personal profiles in terms of relational and high-value actionable information critical for matching both the stated and interpreted personal objectives, characteristics, interests, capabilities, experiences, needs or desires of other members.

According to another aspect of the invention, at the request of its member users, MMx software now conducts a search of all available databases throughout the MMx network for all applicable information and data relating to the mutual specific interests, capabilities, experiences, or objectives profiled by its members.

According to an another aspect of the invention, firewalls, filters, and security systems are incorporated within the MMx database system to prevent the unauthorized use, copying, distribution, sharing, downloading, uploading, commingling, corrupting, transferring, or exchange of any personal or proprietary data, or any matched relational data between members or between originating or participating secondary databases.

According to a another aspect of the invention, the MMx database then permits the downloading of non-identifiable NID-coded (not linked to a specific person, address, social security number, etc), encrypted data sourced from multiple participating or competing commercial databases conforming to the online search criteria submitted by MMx users and thereafter permits the storage of that data, or the codes for the release of that data, including a user's encoded, encrypted personal data, on a single authorized portable MMx mobile storage device.

According to another aspect of the invention, the stored data may be unlocked from the memory of an authorized mobile device, then decoded for display on the display portion or for audio reproduction on the audio portion the device, but only upon receipt of a matching access code broadcast sequentially from another specifically involved, compatible MMx mobile proximity device.

According to another aspect of the invention, once matching access codes are received and confirmed by communicating MMx mobile proximity devices, an encounter protocol is initiated, allowing those users to sequentially escalate communications pursuant to a mutually acceptable, controlled physical encounter. In most cases such encounters would be consummated and enabled through the disclosure of the relative physical locations of the proximity devices involved.

According to another aspect of the invention, all MMx coded transmissions, transmission responses and consummated encounters are recorded on each MMx hard drive.

According to another aspect of the invention, when MMx mobile devices are later interfaced with a user's computer or the Internet for updating, all such passively collected special interest user code transmissions and attempted and consummated encounters are uploaded to the MMx Database System.

According to another aspect of the invention, all such collected special interest user codes and attempted or consummated encounters are catalogued by type, location, and time to provide a broad area picture or a unique "data snapshot" of MMx user types and movements while in the field.

According to another aspect of the invention, this broad area picture or unique "data snapshot" can be made available to commercial advertisers, retail store or mall owners, educators, researchers, law enforcement, and others on a paid, but non-identifiable basis without violating or compromising personal confidentiality or civil liberties.

A specific aspect of the present invention provides a computer implemented method, comprising: compiling a unique profile of a user based on computer analysis of data provided by the user; rewarding the user for providing the data; and displaying hyper-relevant information to the user based on the unique profile. In another embodiment of this aspect, the data comprises specific information regarding who the user is. In other embodiments, the data comprises specific information regarding what the user wants, and the hyper-relevant information is selected based solely on said specific information regarding what the user wants.

In other embodiments, the rewarding step is performed by an entity that acquires the data, or the rewarding step is performed by an entity that is a source of the hyper-relevant information. Further embodiments contemplate that the source of the hyper-relevant information is a third party; or that the source of the hyper-relevant information is an advertiser, an ad agency, or a creator of the hyper-relevant information; that the source of the hyper-relevant information is a central server; or that the source of the hyper-relevant information is a collection of passively-acquired data.

In another embodiment, the hyper-relevant information comprises details related to an opportunity available to the user. In further embodiments, the opportunity comprises an opportunity for the user to display hyper-relevant information to others and the user receives revenue for displaying hyper-relevant information to others. In another embodiment, the opportunity comprises an opportunity for the user to receive revenue for viewing hyper-relevant information presented by others.

In another embodiment, the hyper-relevant information comprises details related to a personal encounter. In further embodiments, a subset of another user's profile is sent to the user for review; or the user can escalate, terminate, or store the information related to a personal encounter. Still further embodiments further comprise sending a subset of the user's profile to another user; wherein the subset of the user's profile was pre-selected by the user for sending to others; or successively exchanging profile content with a plurality of other users until an encounter occurs, is postponed, or is terminated; wherein the profile content is exchanged according to a predetermined script, without inputting additional profile content prior to consummation, termination, or postponement of the encounter. In another embodiment, the hyper-relevant information comprises details related to advertising.

In yet another embodiment, the compiling step comprises: conversion of the data to a non-identifiable (NID) format; and uploading the NID-formatted content to a central server; wherein analysis of the NID-formatted content influences presentation of the hyper-relevant information displayed to the user. In a further embodiment, the analysis of data provided by the user comprises: identifying relational aspects of the data; and expressing the relational aspects according to a system of user codes; wherein the hyper-relevant information displayed to the user is determined according to the user codes.

A further embodiment of the present aspect further comprises updating the profile with new data; wherein the new data comprises responses of the user to the hyper-relevant information. Another embodiment further comprises updating said profile with new data; wherein the new data is acquired in passive manner from a mobile device.

In another embodiment, the user is a member of a particular community; and the user receives the hyper-relevant information in exchange for access to other users in communities other than the user's particular community.

In another embodiment, the unique profile comprises data regarding who the user is; data regarding what the user wants; data regarding the user's past responses to the hyper-relevant information; and data regarding the user's habitual locations. In other embodiments, the data regarding the user's habitual locations comprises data regarding time of day; the unique profile further comprises data regarding agreement between what the user wants and the user's past responses to displayed hyper-relevant information; or the unique profile further comprises data regarding the user's potential future locations. In still another embodiment, the unique profile comprises a plurality of access rights to content of the unique profile; wherein a subset of selected content is accessible to one or more third parties under specific conditions. In another embodiment, content of the unique profile is available for purchase by a third party; and wherein the user cannot be identified by the content available for purchase.

Another aspect of the invention is a computer implemented method, comprising: acquiring data from a first user; wherein the data is actively provided by the first user; rewarding the first user for providing the data; analyzing the data; compiling a unique profile of the first user based on computer analysis of the data; and displaying hyper-relevant information to the first user; wherein the hyper-relevant information is individually selected for the first user based on the profile without human intervention.

One embodiment of this aspect further comprises compiling a unique profile for each of a plurality of users; and populating a central server with unique profiles for each of the users from whom data is acquired. Another embodiment further comprises compiling a unique profile for each of a plurality of users; and storing a unique profile for each individual user on a mobile device belonging to that user. Another embodiment further comprises selecting at least one unique profile of another user based on computer analysis of the data acquired from the first user; and storing the selected at least one unique profile of another user on a mobile device belonging to the first user.

Another aspect of the invention is a computer implemented method, comprising: compiling a unique profile of a user based on computer analysis of data provided by the user; storing the unique profile of the user on a mobile device; rewarding the user for providing the data; displaying hyper-relevant information to the user based on the unique profile; updating the unique profile with data related to responses by the user to the hyper-relevant information; and transmitting the updated unique profile to other receiving devices in range; wherein additional hyper-relevant information is displayed to the user based on the updated unique profile.

Another aspect of the present invention is a computer implemented method, comprising: compiling a unique profile of a user based on computer analysis of data provided by the user; rewarding the user for providing the data; exchanging unique profile data between a plurality of users in a location; wherein the exchanging step is performed without user input; comparing unique profile data of each user to each of the plurality of users; and displaying hyper-relevant information to the user based on the comparison of the unique profile of that user to the unique profile of other users.

Another aspect of the present invention is a system, comprising: a computer; and programming executable on the computer for performing the steps of: compiling a unique profile of a user based on analysis of data provided by the user; rewarding the user for providing the data; and displaying hyper-relevant information to the user based on the unique profile.

Another aspect of the present invention is a system, comprising: a computer; and programming executable on the computer for performing the steps of: acquiring data from a user; wherein the data is actively provided by the user; rewarding the user for providing the data; analyzing the data; compiling a unique profile of the user based on analysis of the data; and displaying hyper-relevant information to the user; wherein the hyper-relevant information is individually selected for the user based on the profile without human intervention.

Another aspect of the present invention is a system, comprising: a computer; and programming executable on the computer for performing the steps of: compiling a unique profile of a user based on analysis of data provided by the user; storing the unique profile of the user on a mobile device; rewarding the user for providing the data; displaying hyper-relevant information to the user based on the unique profile; updating the unique profile with data related to responses by the user to the hyper-relevant information; and transmitting the updated unique profile to other receiving devices in range; wherein additional hyper-relevant information is displayed to the user based on the updated unique profile.

Another aspect of the present invention is a system, comprising: a computer; and programming executable on the computer for performing the steps of: compiling a unique profile of a user based on analysis of data provided by the user; rewarding the user for providing the data; exchanging unique profile data between a plurality of users in a location; wherein the exchanging step is performed without user input; comparing unique profile data of each user to each of the plurality of users; and displaying hyper-relevant information to the user based on the comparison of the unique profile of that user to the unique profile of other users.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 5A:
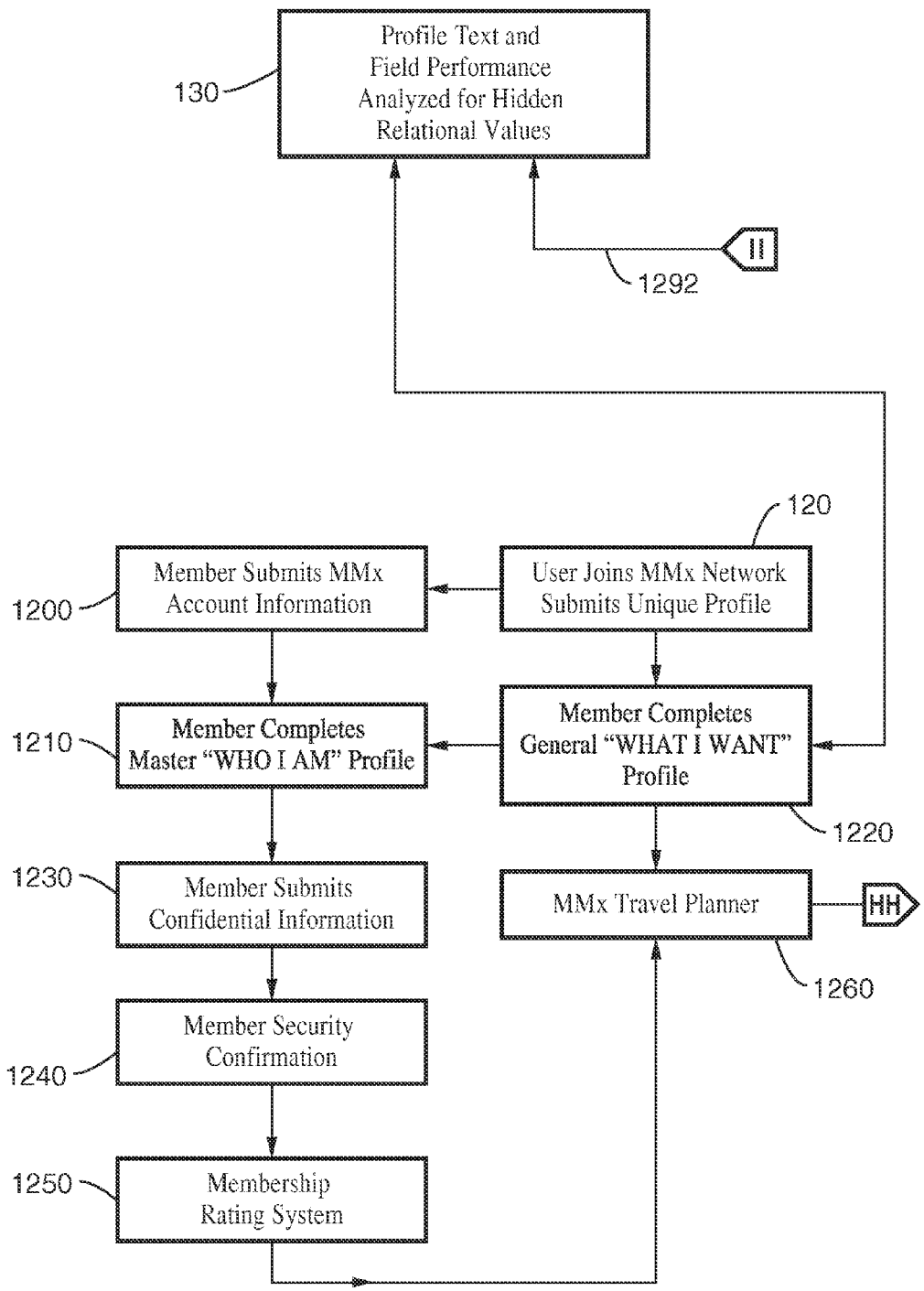
Figure 5B:
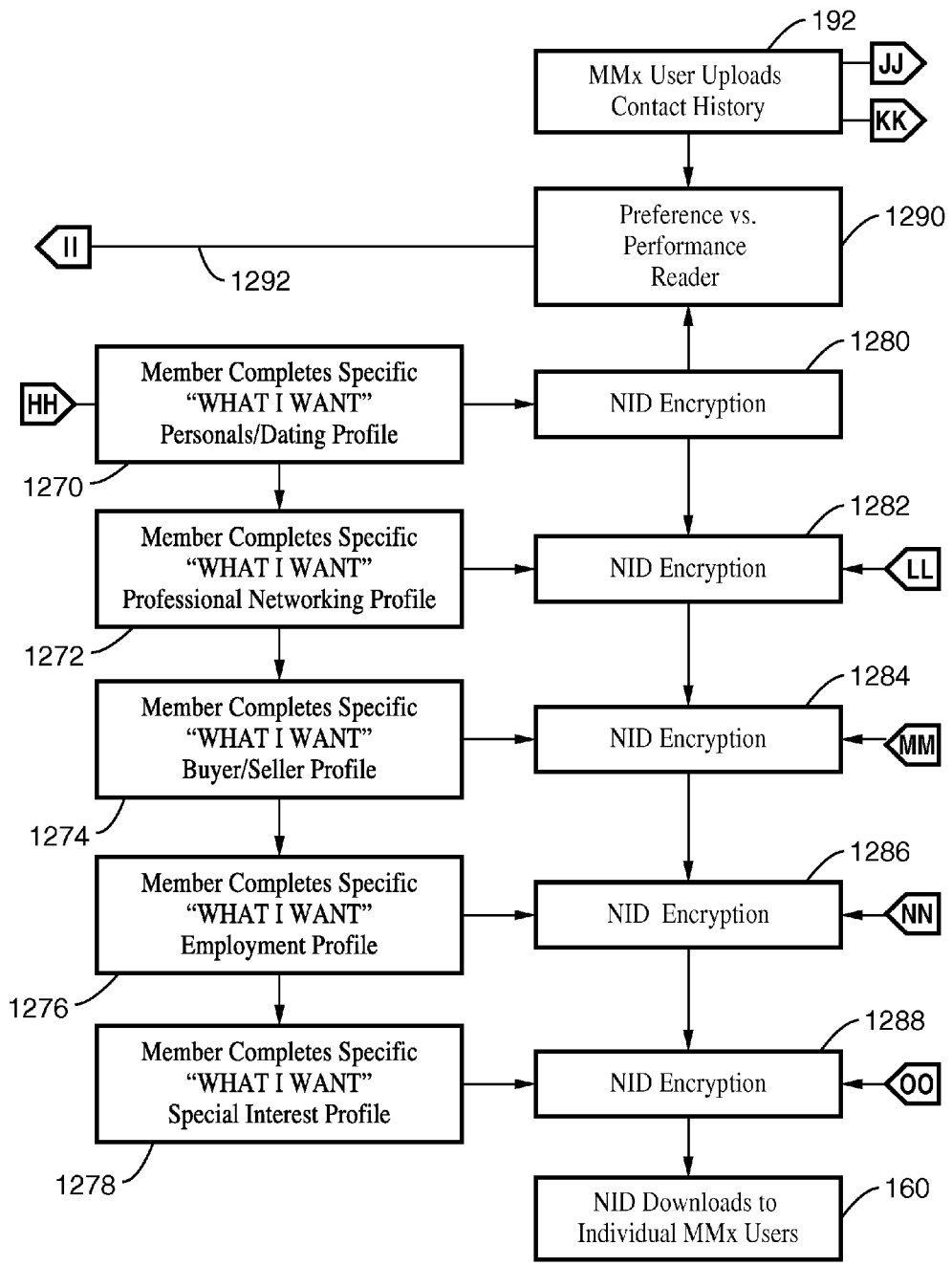
Figure 5C:
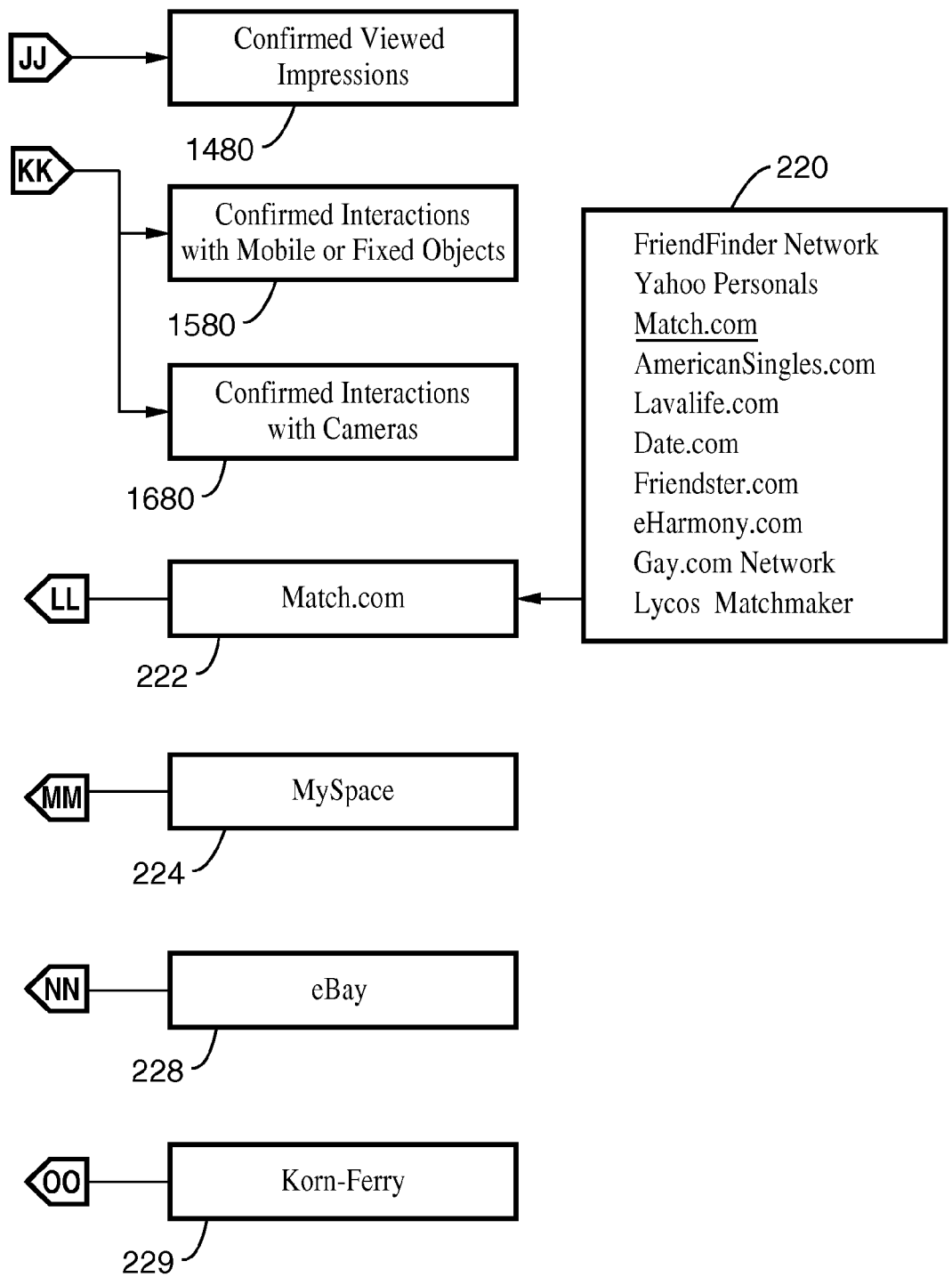

FIGS. 5A, 5B, and 5C are a flow diagram illustrating an embodiment of a Member Profiling Model according to the present invention.

Figure 6A:
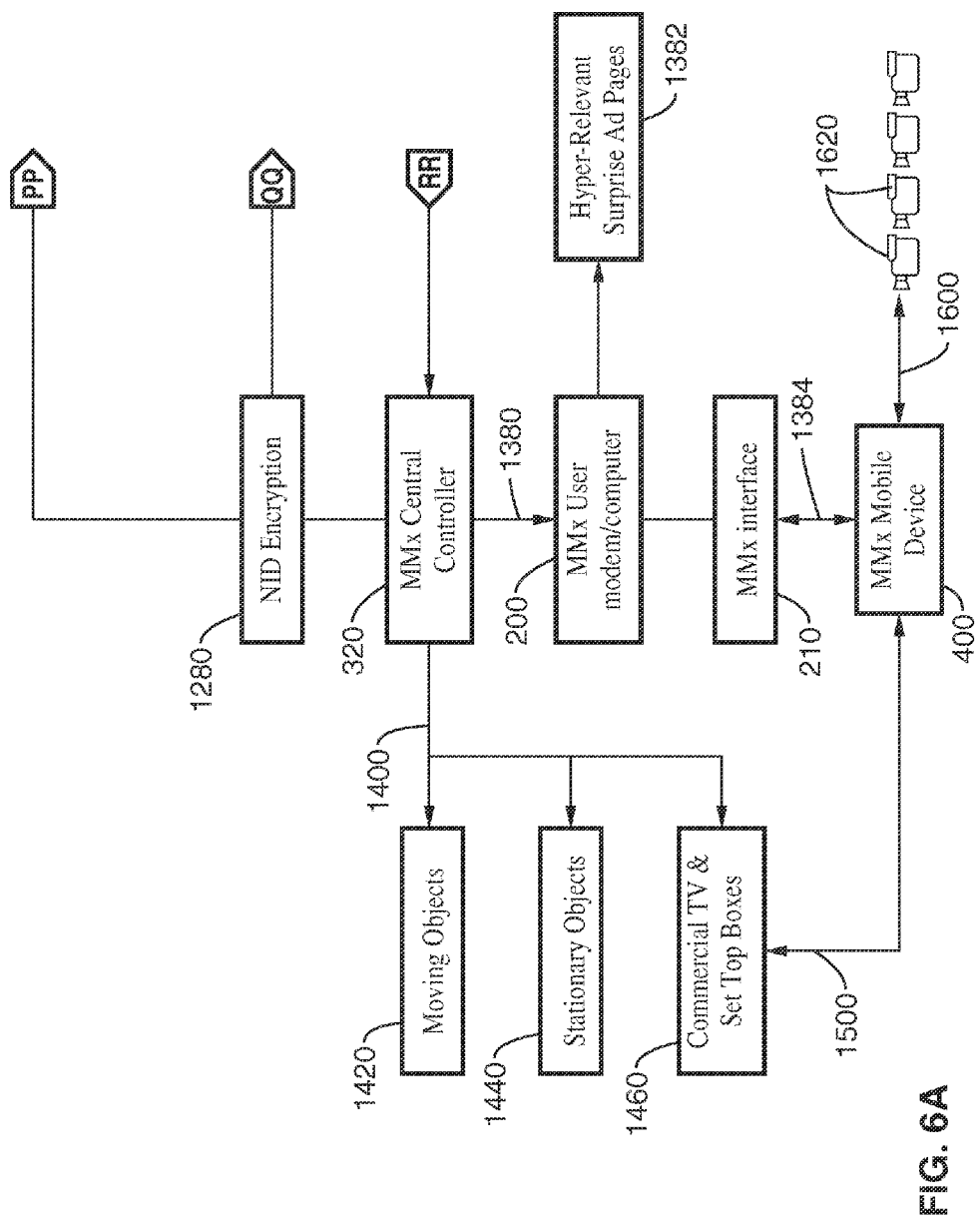
Figure 6B:
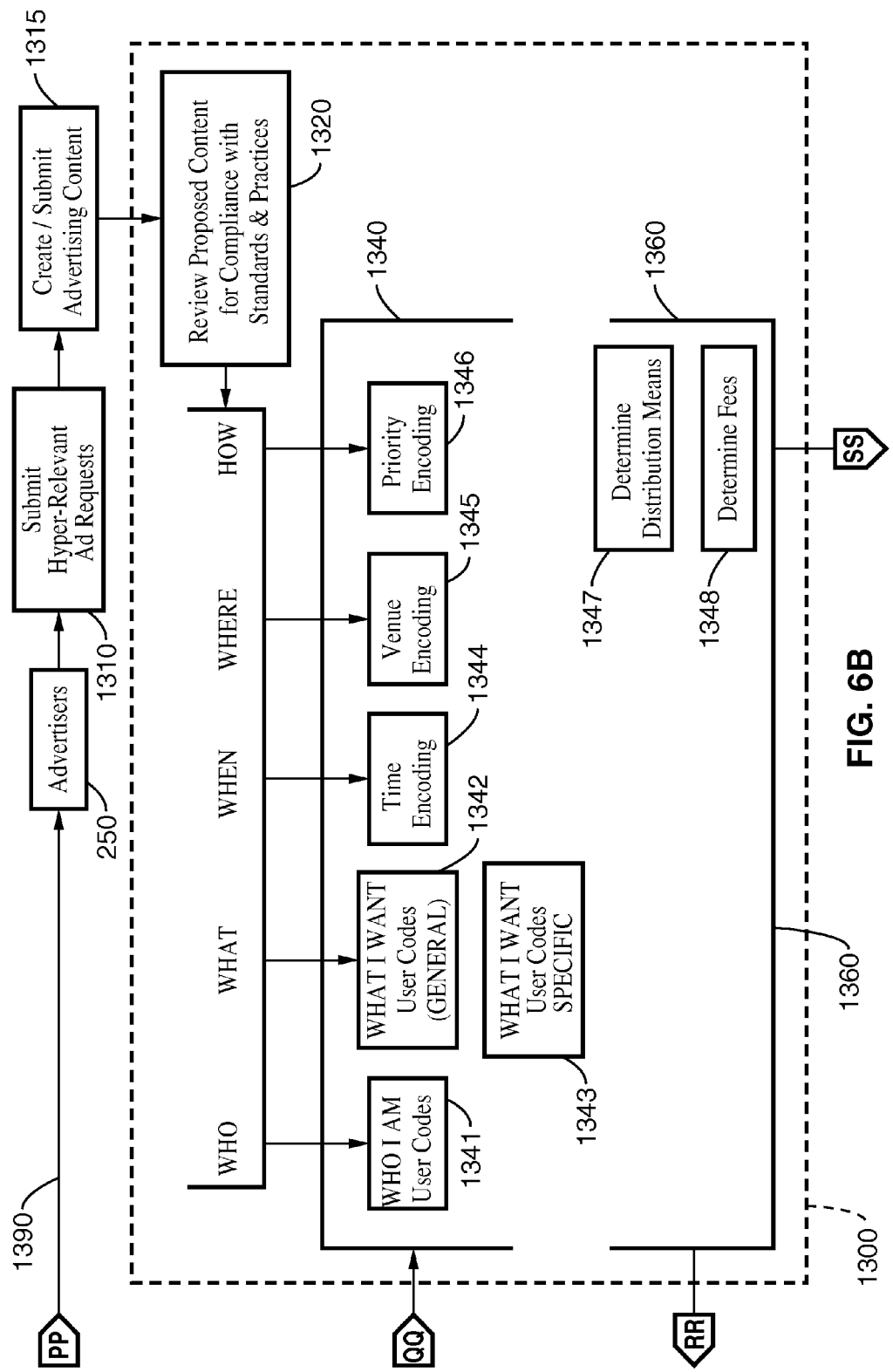
Figure 6C:
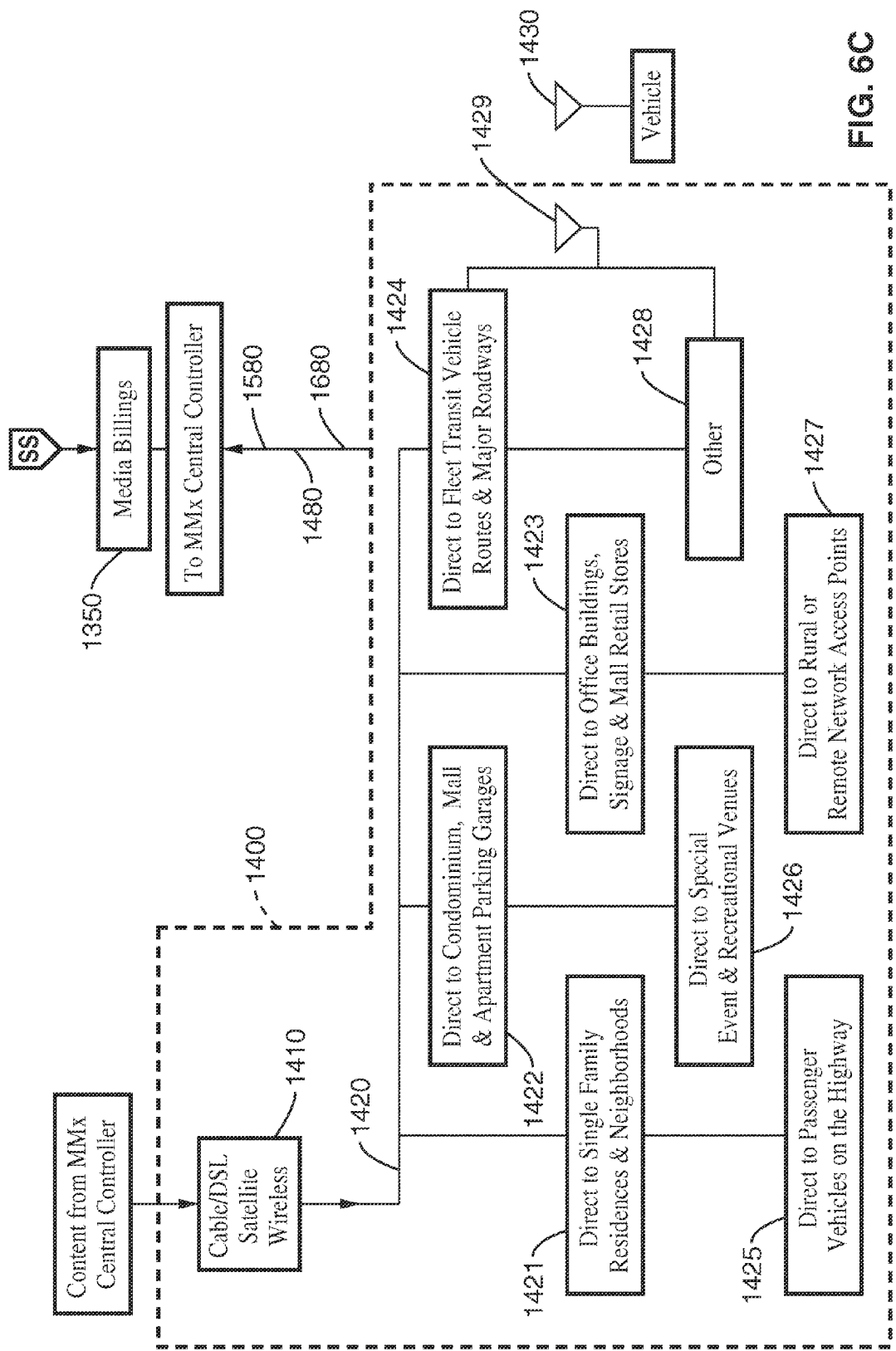

FIGS. 6A, 6B, and 6C are a block diagram illustrating an embodiment of a Media Processing and Ad Distribution Model according to the present invention.

DETAILED DESCRIPTION OF THE INVENTION

Figure 1A:
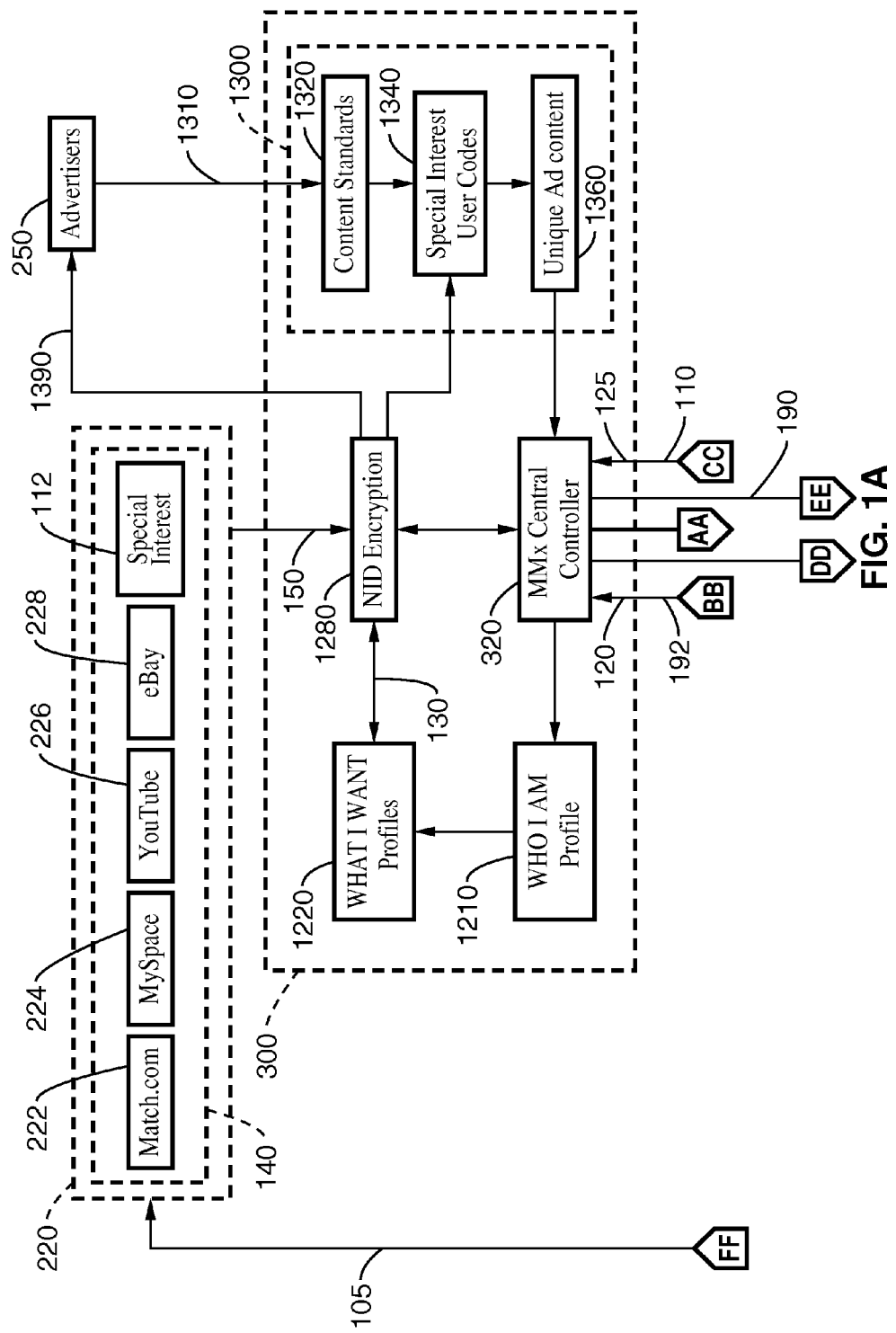
FIGS. 1A and 1B are a block diagram illustrating the overall system of the present invention.
Figure 1B:
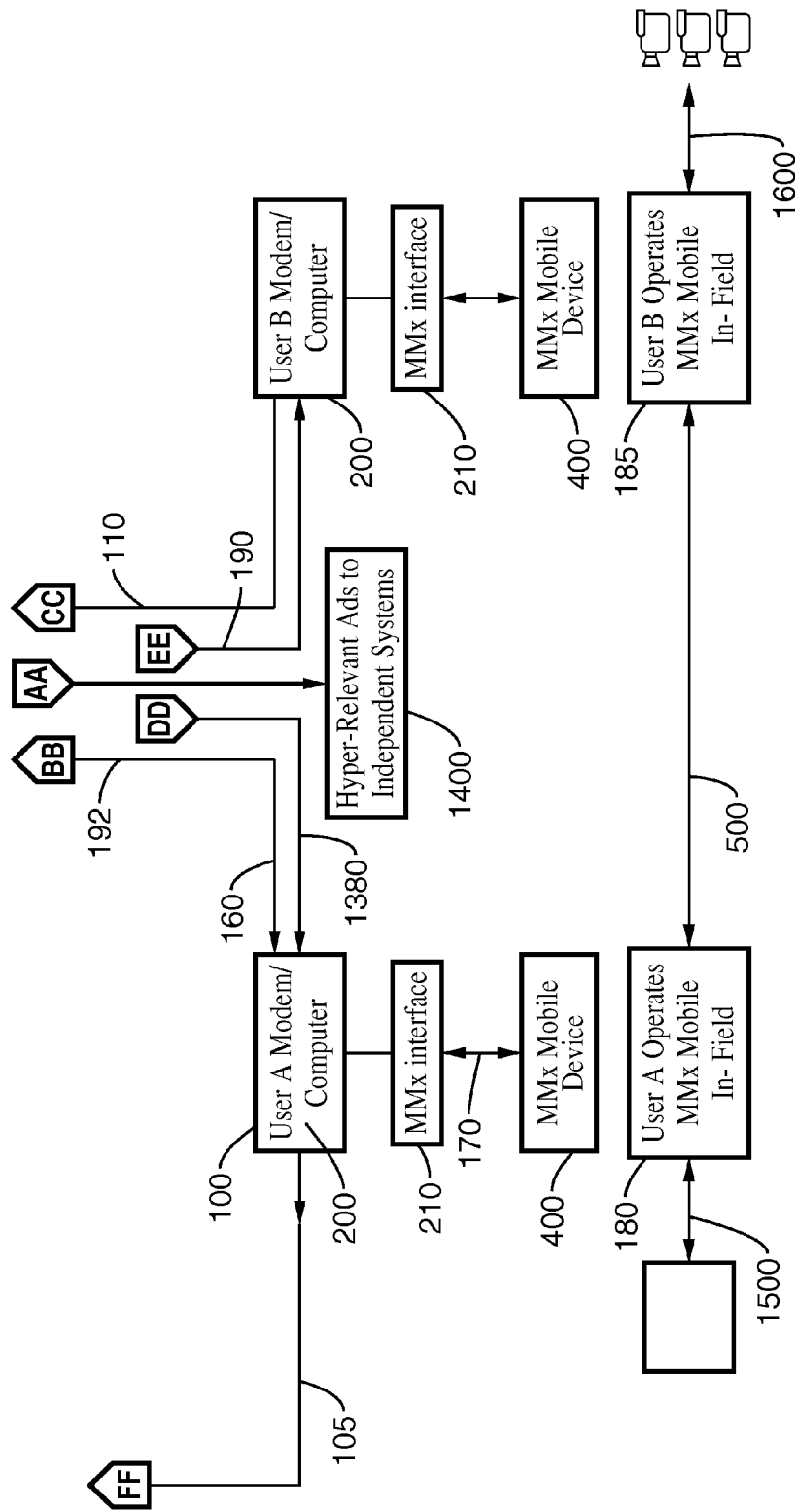

The invention can best be understood by first referring to FIGS. 1A-1B, System Overview. The invention deals with the deployment of a dedicated wireless technology to act as the aggregator for numerous existing and newly created Special Interest databases. In a preferred embodiment involving existing databases, system adoption would involve users who are members of an existing database. Such a user is shown in FIG. 1B at 100. One revenue model assumes such users would initially use and pay the owner/operator of at least one commercial database for the right to access, post, and download information of personal interest. One of the most common commercial Internet databases is in the "Personals/Dating" category, often referred to as "online dating." Such a database is assumed in this example since they are well established and cover a multiplicity of user types, interests and locations. Note that in FIG. 1B, there are two user computer/modems indicated at 200, one for User A another for User B. Each user requires an MMx interface 210. The MMx interface is essentially a docking port for the MMx handheld device 400, plus connectors and cable linking it to the computer/modem for uploads, downloads, and charging.

Under one preferred embodiment, user A is an existing subscriber of Match.com, shown at 222, an existing online database specializing in Personals/Dating. Five databases are represented in FIG. 1A in the group shown at 220. In addition to Match.com, there is MySpace at 224, YouTube at 226, and eBay at 228. These shall be referred to hereinafter as "originating" databases. There is a fifth database shown at 230. In an alternate embodiment, User B was not a member of an established database and thus joined MMx directly as a new Special Interest user at database 230. Based on current industry Personals/Dating practice, a user might join more than one database in an effort to increase his or her chances for success or in reaching a broader selection of candidates. As a result, such users can end up paying simultaneously for multiple databases while exposing themselves to some of the same candidates. Clearly, this dilutes the benefit of the added expense. By adapting the method and apparatus of this invention, users can gain access to numerous, if not all, available databases, while they are paying for a membership in only a single database—the MMx database—for wireless electronic encounters. Variations of the preferred embodiments will be discussed later. In some cases, memberships and access to multiple databases can be had under an advertising-supported business model, in which case MMx service—and, in some cases, the handheld units—may be free of cost to the consumer.

The MMx online network is joined by following the traditional practice of selecting a payment plan, submitting a valid credit card, opening an account by creating a user name and password, and by completing an online application form. Following this, all new users will prepare and submit detailed user profiles. These profiles (explained in more detail later) contain specific information on each user and on the type of persons they wish to meet. User A is shown at 120 and User B is shown at 125, submitting their respective unique profiles via the Internet to the MMx Database System 300.

User profiles are received at 300 together with all relevant and traditional consumer information, as required under the MMx Enterprise's operating criteria. Once received, at 1280, profiles are then processed using proprietary MMx software which first separates out all member identifying criteria such as a user's name, social security number, phone numbers, addresses and other information relating to the identity of the specific member/user. What remains are called Non-identifiable (NID) user profiles, formatted to protect the privacy of the users and the security of the data belonging to all members, since these will be later encrypted and distributed wirelessly between MMx mobile units in the field. The user's identity remains on file for normal business operations, however, the MMx privacy policy removes all identity from a member's specific background and special interest profiles.

As shown at 130, MMx NID profiles are next processed using proprietary (or licensed) software designed to sift through the unstructured text-based responses of member's online profile questionnaires. The MMx process identifies critical information and relational elements hidden within the free-form unstructured content of the MMx questionnaire and then automatically compares these to the structured profile responses to unlock unique values and hidden data contained in these voluntary profiles. By comparing what users say about "who they are" and "what they want" in their structured vs. unstructured profile responses, and by then fusing this information into the MMx search protocols, the MMx system is able to assure and deliver a higher level of satisfaction to a user's in-field encounters. Additionally, by recording the actual use and encounter histories relative to a member's stated or intended preferences and objectives, as later shown in FIG. 5A at 1292, MMx can learn from a user's actions, then make suggestions or introduce changes to assure a more rewarding user experience. The return of this information to the system is shown at 130 in FIG. 5A. MMx text analysis software is available through Attensity Corporation, 3600 West Bayshore Road, Palo Alto, Calif. 94303.

Continuing with FIG. 1A, once profiles are processed and approved, MMx users are allowed to use the network to conduct personal, online searches 140 of all of the applicable databases 220 participating on the MMx network. Users do not know, and would not necessarily need to know, the specific database they are sourcing. The results of searches 140 matching the exact criteria for a member's unique profile are downloaded at 150 for NID encryption at 1280, then to the MMx Database Central Controller 320.

Such downloads are hereinafter referred to as Composite Search Results or CSRs. CSR downloads 150 following encryption are sent to the MMx Central Controller 300 for on-demand delivery via the Internet to individual MMx users. CSRs remain unique to each MMx member because they are based on unique, yet constantly changing, profiles monitored for each member at 300. CSRs consist of encoded, encrypted Non-identifiable (NID) Personal Profiles of other members, and the decryption codes necessary to decode NID Personal Profiles. CSRs from all applicable databases are then periodically downloaded via the Internet at 160 to individual MMx member computer/modems 200 and interface 210. Although MMx members can access their originating database normally through their original database's web site, they are prevented from decrypting, duplicating, distributing, copying, sharing, uploading, commingling, transferring, or otherwise exchanging CSR data with any other computer or any other MMx user. Once CSR data has been downloaded to an MMx user's computer, it can only be transferred one time in its NID encoded/encrypted state, as shown at 170, to that same user's certified MMx Mobile Device 400.

Large numbers of MMx users may now activate and carry their personal MMx Mobile Devices 400 into the field. If an MMx Mobile Device is switched on during the course of the day, it can alert its user to the potential for an electronic encounter based on the encoded data it now contains. FIG. 1B indicates a wireless encounter protocol 500, enabled between User A 180 and User B 185.

During the process of completing their "WHO I AM" and "WHAT I WANT" profiles, each member has disclosed, on a secure basis, information about his personal experiences, knowledge, acquaintances, and histories, along with information on the kinds of things, events, needs, wants, and relationships he would yet like to experience. This information is of essential value to the MMx Database System for the purpose of providing a safe, secure personal consumer encounter experience. It is also of great value to commercial advertisers who are interested in exposing their products and services on a cost effective basis to consumers who have expressed a particular interest buying or using those products or services.

Continuing with FIG. 1A, once personal user profiles are created at 1210 and 1220, they are encrypted at 1280 into database access codes and from there, at 1340, into Special Interest User Codes which can be used by advertisers 250, to create highly targeted advertising content. At 1390, member advertisers are allowed to purchase at least two types of marketing information. The first kind of information is in the form of Special Interest User Codes, processed at 1340. These are based upon and generated by consumer-prepared MMx NID-encoded profiles. None of the information made available to advertisers or third parties is ever associated with a specific individual, or with a specific individual's personal information, outside of the MMx Database System 300.

The second kind of information is comprised of relatively general data derived from monitoring the interaction of MMx devices and usage in the field. As each MMx handheld device communicates with others in an effort to match transmitted user access codes for the purpose of potential encounters, it emits an encoded signal which describes the essential nature, makeup, and interests of the seeking party. Regardless of actual matches, communications, cancellations, or consummated encounters, every MMx handheld unit may, if so programmed, receive and store such in-field transmissions. Each of these transmissions is time-stamped and identified by location. These codes are then collected whenever a user links his MMx unit 400, to his interface 210, and his computer/modem 200 or, alternatively, when he uploads information via direct link to the Internet through a network access point using, for example, WiFi or WiMax. Once collected, these data can be categorized as to the time of day and precise GPS, transponder, triangulation, or similar locating means, as well as to the demographics, psychographics, home venue, gender, etc., and the user's general or specific interests and objectives. For example, the predominant character, nature, wishes, or needs of visitors to malls or shopping centers, convention centers, a university campus, a sports or political event, or even an unlawful assembly—to the extent such users possess operational MMx units—a specific MMx user population sample can be documented and defined in sweeping general terms based on the precise data for those in attendance within the area. Such fluid and transitional information can be invaluable in terms of community and events planning, research, and discovery and, most significantly, commercial marketing and advertising.

Referring again to FIG. 1A, as a first step in this process, advertisers 250 may request or purchase various types of MMx-generated data at 1390. From this research, which is formatted following commonly known market research and statistics gathering practices, marketers are able to create and produce a wide variety of commercial content. This content is submitted to the MMx Database System for approval as shown at 1310. Advertisers must conform to established content standards. An initial approval stage is shown at 1320. These are essentially guidelines marketers must follow if they wish to distribute unique content through the MMx network to its subscribers. At 1340, Special Interest User Codes are then linked to ad submittals, which are then are packaged as unique ad content or impression pods at 1360 and scheduled for distribution to those MMx subscribers who match those user codes. The last step in the process is shown at 1380, where unique ad content, now referred to as "hyper-relevant" ad impressions, are downloaded via the Internet or other means directly to users' computers, and, optionally, to those users' handheld MMx devices 400.

It is important to note that the MMx online process allows major brand advertisers, for the first time, to safely deliver and post ads on consumer-generated content web sites. Should you be a major brand advertiser, you needn't worry that your ad will ever be viewed by a mass audience next to distasteful or unacceptable content. The reason for this is twofold: (1) unlike traditional advertising, which is posted on publicly-viewed pages together with numerous personal or personally-generated pages for anyone to see, MMx content is packaged and delivered privately, as a separate, custom-tailored page (or pages), to each specific user only for his or her viewing pleasure or purposes. MMx users in a typical or preferred embodiment generally do not have access to the pages of other users as they would with some other consumer-content driven social networking web sites such as MySpace, 224 or YouTube, 226. They only have access to their own pages, or to the pages of others under controlled conditions unique to specific sites. (2) every ad that is distributed to a user's individual page has been selected, created, and scheduled based on the precise interests and needs of that specific user, and derived entirely from that user's "WHO I AM" and "WHAT I WANT" personal profiles. Such profiles, which will be explained in a later section, are personally edited and updated by each individual consumer and are further subject to automated software interpretation based on historic in-field subscriber performance using MMx encounter products. Performance data is uploaded to the MMx Database System 300, as shown at 192, and the latest MMx user content downloads are completed as indicated at 190 and 1380, all via the Internet.

Once data is transferred to individual MMx mobile devices 400, as indicated at 170, these handheld units are able to interact in the field by exchanging and matching user access codes under a wireless protocol 500, explained in a later section. In addition to communication with other MMx units, each MMx handheld mobile device has the capacity to interact essentially in the same way with a variety of specially equipped stationary or moving objects in the field. Such objects may include various types of fixed signage and moving objects, such as automobiles or other kinds of passenger or cargo carrying vehicles. The uploading and downloading of content and data relating to these communications is indicated at 1400. FIG. 1B indicates at 1500 wireless communications with a potential variety of moving objects such as automobiles, trucks, trains, boats, aircraft or similar occupant-carrying conveyances. This includes communications with a variety of stationary objects which can typically surround MMx users such as road signage, billboards, storefronts, and similar architectural or other surfaces capable of supporting electronic displays. Finally, at 1600, the invention is able to transmit a coded signal to remotely located video cameras and other types of remote monitoring equipment, which are then able to record imagery in the vicinity of the invention, or document various types of user or usage data stored by the invention.

Figure 2:
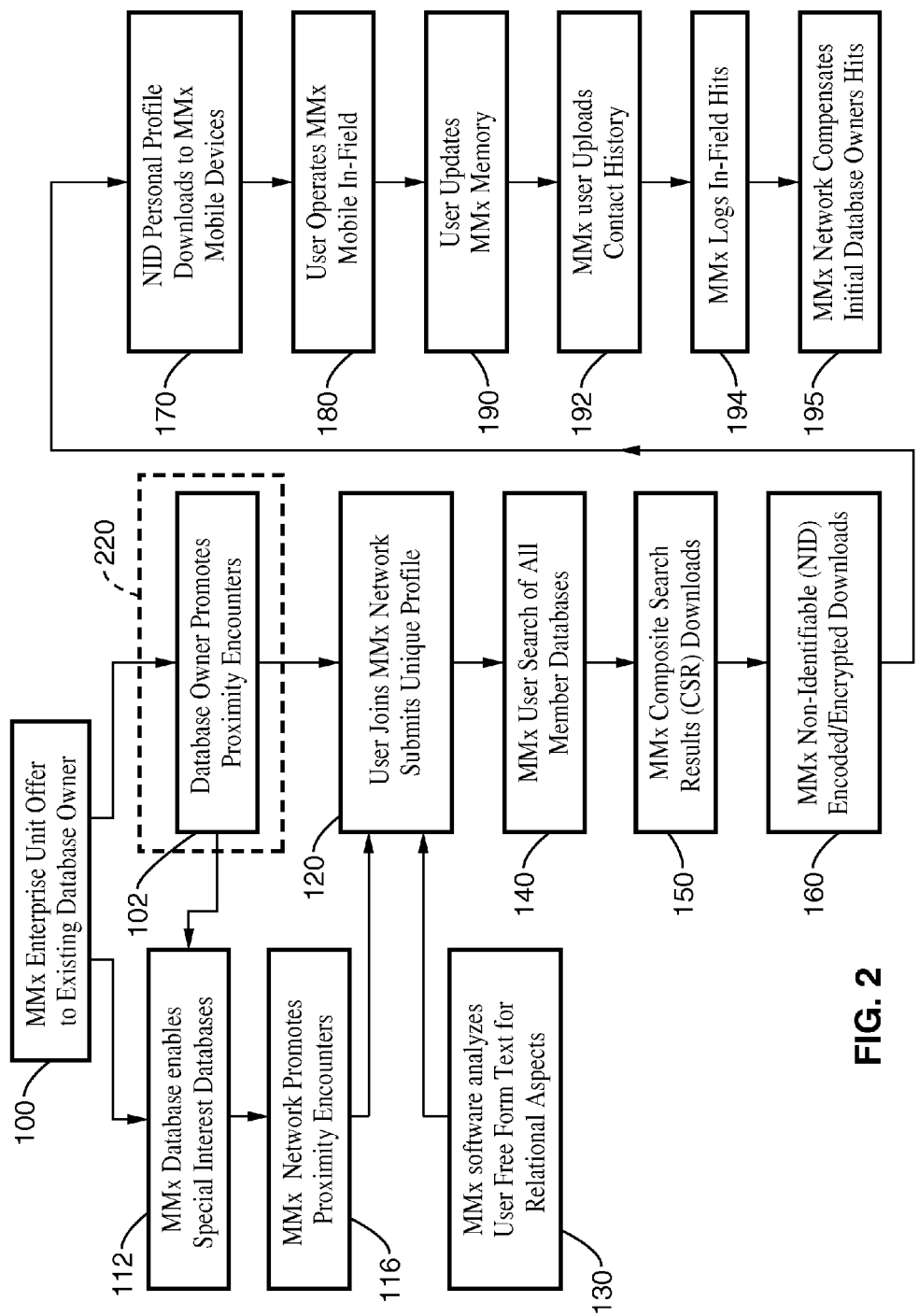
FIG. 2 is a flow diagram illustrating an embodiment of an Encounter Model according to the present invention.

FIG. 2 outlines the interacting elements of a business model designed to create new databases and to aggregate existing databases through the adoption of dedicated wireless proximity communications. The business model assumes the creation of a business unit responsible for the design, manufacture and distribution of MMx wireless encounter devices as well as for the development and management of the associated software and Internet operating systems. This business unit is referred to herein as the "MMx Database System" 300, shown in FIG. 1A. The sequence of interactions shown in FIG. 2 describes the essential steps in proximity encounters. Once established, the MMx Database System can extend an offer 100 to appropriate established database owner/operators inviting them to join and participate in the MMx wireless encounters network. By becoming a participant, a database owner/operator is able to offer its own subscriber base the novel option of engaging in wireless proximity encounters in the field, an activity which is a logical extension of that database owner/operator's core online business. The adoption of dedicated MMx wireless encounters technology allows such users to communicate with other current subscribers, but as importantly, it allows the members of one database to meet with the members of all other of the participating databases who similarly adopt the technology. By adding this service, a database owner/operator helps to assure the viability of his own business because he is offering his customers a wireless encounter capability which enhances his original online capabilities. Participation also helps the established database owner/operator to maintain and assure his competitive position in the marketplace. If he cannot offer such novel services, he risks losing customers to other database owner/operators who do. An established database owner/operator 220 would agree to make his database available to the MMx network and to advertise and promote MMx wireless encounter products and services on its web site, as indicated at 102. Acceptance of the MMx Database System's offer 100 designates the accepting established database owner/operator 220 as an "originating database." When MMx service is extended to, or is partnered with, an established database that operates on a fee or paid membership basis, the MMx Database System could then promise to pay a fee or a percentage of any fees collected from any member of the "originating database" who subsequently joins the MMx network as a paying subscriber. In other words, in one preferred embodiment of the invention, each new member of the MMx network might first have a sponsoring or "originating" database. However, in a variation of this embodiment, the MMx network can itself create proprietary databases as shown at 112. These are called Special Interest databases; one is shown at 112 in FIG. 1A. In this instance, the MMx Database System, or an entity controlled by it, would be designated as the originating or sponsoring database and will be responsible for promoting MMx products and services as shown at 116. In this alternate example, membership fees collected, if any, would be distributed internally between the MMx Database Systems involved. It is anticipated, however, that the majority of Special Interest databases will operate on a free or advertiser-supported revenue basis. Finally, the MMx Database System may additionally offer to pay, at 100, participating originating database owner/operators a fee, or a percentage of any fee, collected from MMx users who actually consummate a proximity encounter in the field. Such charges are recorded on an ongoing basis in much the same way as completed cellular phone calls are recorded and billed. The various user plans and financial options are presented to new users upon joining the MMx network at 120.

Block 120 represents the first step in the proximity encounter process. After opening an account through commonly accepted online practice, each new user will execute at least two highly detailed master profiles: one on himself, and one on the specific kinds of individuals, objectives, experiences, and the like he is seeking in his encounters. Part of this search and preference criteria may have been formatted by the originating/sponsoring database. Such search and preference criteria is further synthesized into the MMx master format profile which both filters and standardizes the search and preference criteria from and for all participating databases. At 120, every new user will submit a unique personal profile about himself, which he may update periodically. He is also offered the opportunity to format a master General Profile and detailed Specific Profiles defining precisely the exact nature of what that user is seeking. These profiles are described in a later section. The more detailed and specific a user's preferences and choices, the greater the user's chances of having meaningful encounters in the field. After these profiles are completed using MMx online guidelines, they are submitted to the MMx Database System for approval. It is at this point, at 130, that these profiles are subjected to the unstructured text analysis and comparisons previously explained. New users may now, at 140, request online searches based on their detailed search profiles. At 140, they are also offered an opportunity to "detune" their encounter requirements by prioritizing their search and preference criteria. As will be shown in FIGS. 4A-4B, the Encounter Protocol permits MMx mobile devices 400 to be reconfigured in the field so they can conduct searches that are either more specific or less specific, or that physically search over greater or smaller proximity ranges or distances. The more detailed and specific a user is in completing his responses to the questions, the greater his chances are of encountering, or of being encountered by the kind of person or situation he desires, although fewer encounters can be expected. Conversely, the less specific or exacting a user is in completing his MMx master or specific profiles—the more he detunes his encounter criteria—the greater the number of potential encounter candidates he can expect in the field, though these may be less to his liking. Clearly, a larger the number of encounters that do not correspond to a user's real needs or desires will become a waste of that user's time and is likely to lower the user's level of customer satisfaction.

Basic search techniques of this type are well known within the industry. An important improvement in the MMx's business model is the use of a proprietary master search and preference profile through which all varying and competing commercial databases are filtered. A second important improvement is the use of a dedicated method and electronic apparatus to enable the secure wireless proximity encounters themselves. By combining these, a novel system is created whose qualities and benefits have been heretofore unavailable. Thirdly, by deep searching to precise and uniform standards, the greatest number of qualified candidates from diverse and traditionally competitive unrelated databases, there is little, if any, duplication or redundancy to the consumer. By employing proprietary analysis software to interpret hidden elements in consumer search criteria, MMx optimizes the time, effort, quality and expense a consumer must invest in spontaneous encounters on a per encounter basis.

Shown at 150, the Composite Search Results (CSRs) are downloaded according to master search criteria at the MMx Central Controller 320. CSRs constitute the raw, basic search results from all participating databases pertinent to the search parameters of a requesting MMx user. Here the CSR data is filtered and formatted under a user's master profile and is then encoded and encrypted for delivery in an NID format to the specific requesting user.

At 160, encoded and encrypted NID/CSR data is securely downloaded via the Internet to a specific requesting user's computer through MMx interface 210 and modem/computer 200, as shown in FIG. 1B. In its downloaded form such content is not directly usable by any MMx consumer since it is encrypted and can only be unlocked and read by another matched MMx mobile device 400 during an actual wireless encounter, 500 as shown in FIG. 1. This inherent security measure prevents the deliberate, unauthorized or accidental copying, sharing, downloading, distribution, uploading, commingling, corrupting, transfer or exchange of personal or proprietary information between any originating or any participating MMx member databases, or between consumer controlled computers or MMx mobile devices.

At 170, in a Personals/Dating preferred embodiment of the invention, NID Personal Profiles are downloaded via an MMx user's computer to his authorized MMx mobile device 400, as shown in FIG. 1B. Authorizations assure that a specific NID download occurs only once to a registered mobile device. Encoded and encrypted data can be transferred via firewire cable, wireless WiFi, Bluetooth, or similar means to the hard drive 480 of the mobile device 400 registered to that user. Downloads are secure and cannot be repeated once a single successful download to a registered mobile device has been completed. It is anticipated that the computer download step shown at 160 will be merged with 170 since MMx mobile devices will eventually be internet capable, having the ability to search and update when linked to the Internet in the field.

Figure 4A:
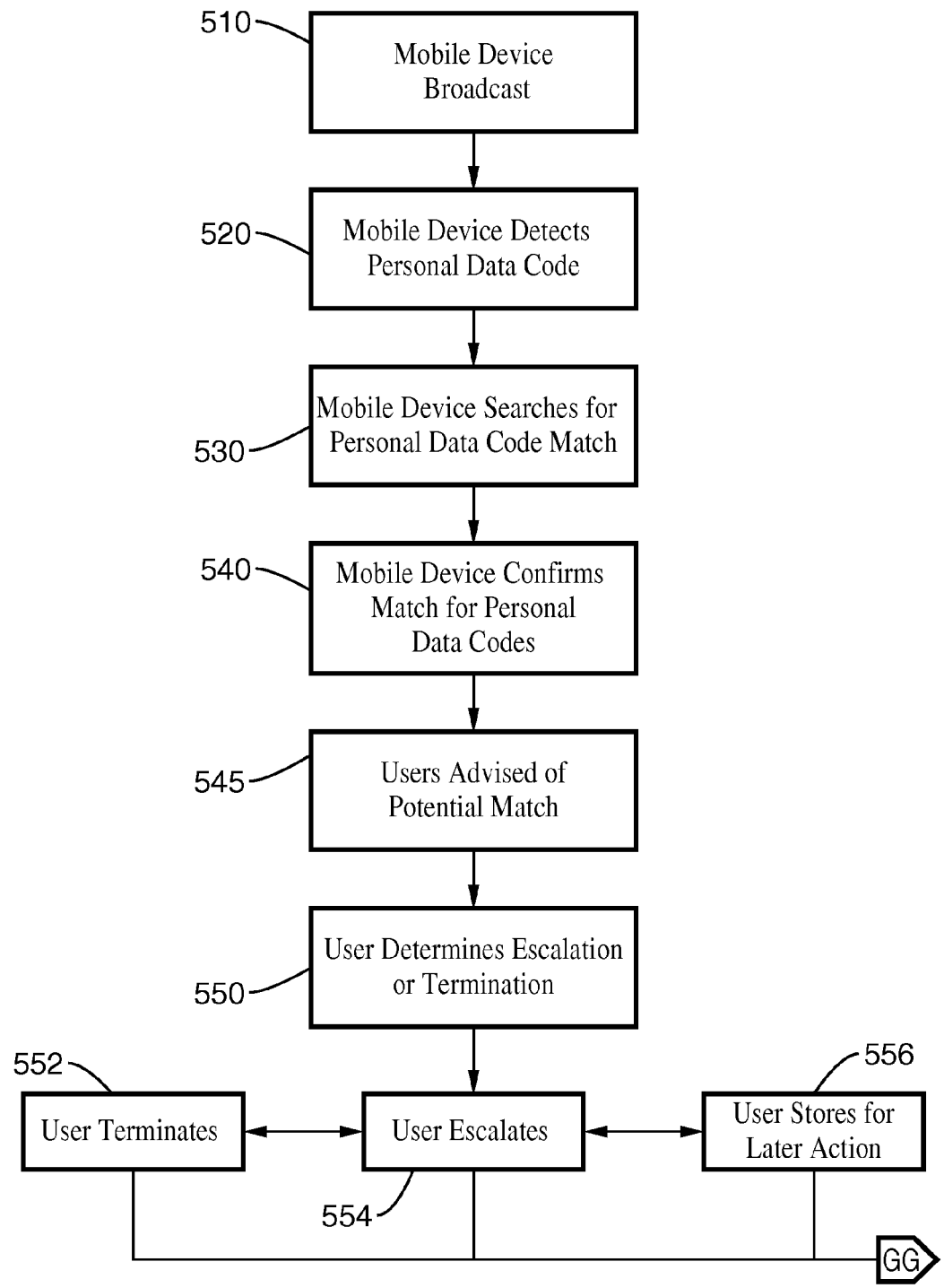
FIGS. 4A and 4B are a flow diagram illustrating an embodiment of Encounter Protocol according to the present invention.
Figure 4B:
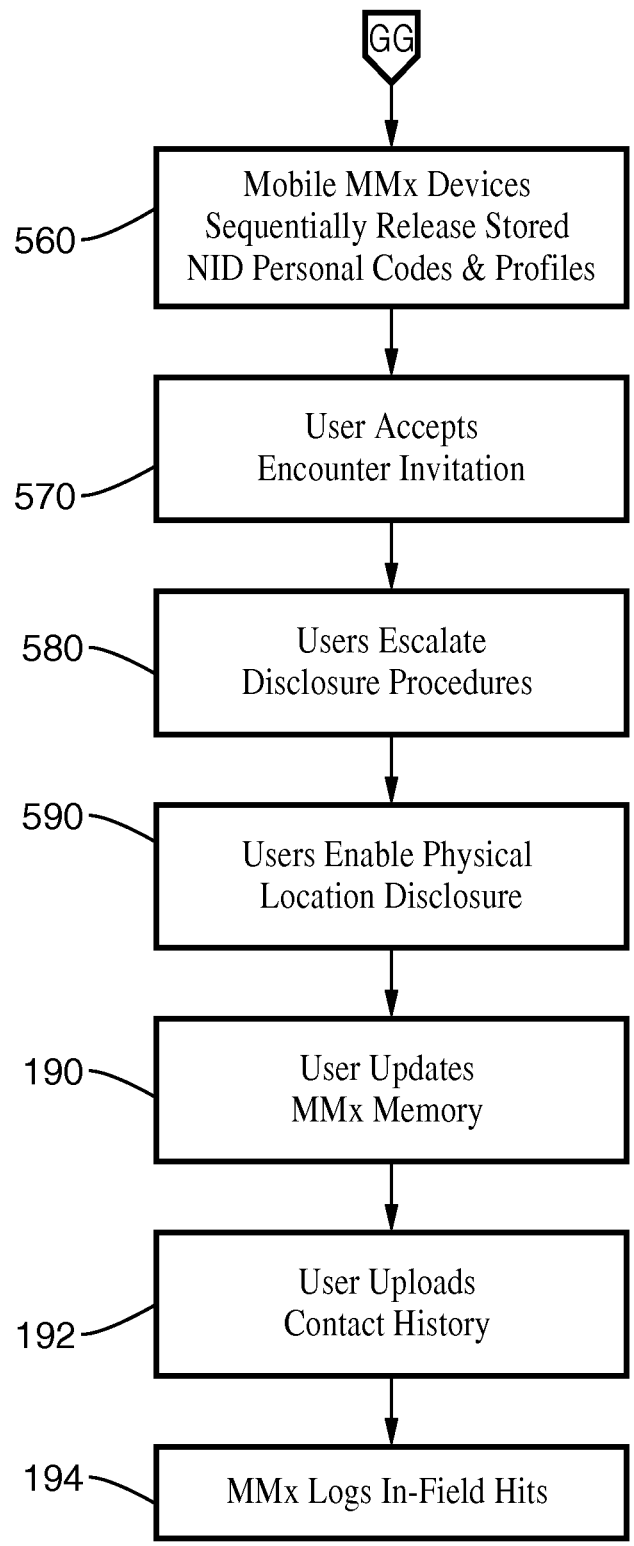

At 180, the MMx member uses his mobile device in the field as described in the Encounter Protocol, shown in FIGS. 4A-4B. When an MMx unit is switched on in the field, direct, wireless communication is enabled between one or more MMx mobile devices 500, within specific or preset ranges of each other. During these communications, a user is alerted to the presence of a potential encounter that matches his or her exact interests or specifications. The user then determines whether he wishes to escalate the encounter in pursuit of a physical contact, to reject the potential encounter, or to document and store the potential encounter for later use. Such encounters or potential encounters along with the user's decision/response are recorded on the internal log of each MMx mobile device 400.

When the MMx user is again at his computer, or optionally is in the field using available wireless network access points (NAPs, or "hotspots", as they are known), he is able to update the memory in his MMx mobile unit, as shown at 190. By updating his device, he may be given the codes or profiles for any new members automatically searched since his last download, along with any new or updated data such as deletions or changes to the member profiles previously searched. During such updates or newly requested search downloads, the MMx unit 400 will automatically upload the user's most recent in-field Contact History as shown at 192, and which is discussed in more detail in FIGS. 4A-4B.

In 194, during updates, the MMx Central Controller logs any in-field contact histories by documenting all encounters that have been attempted, completed, rejected, or stored for later use. Such contacts are described as in-field "hits." This log will include a record of any "fully-escalated encounters," in other words those in which two or more MMx members have released to each other sufficient data to enable an actual physical encounter, as further described in 550 of FIG. 4A. These fully-escalated encounters 554 will be recorded in detail for the accounts of each MMx user concerned and, if the business model so dictates, those users may be billed, or their credit cards charged, for this communications service in much the same way as a telephone or cellular company charges for its completed calls. The MMx Central Controller will also log and document any user-terminated potential encounters 552, and any user-aborted or user-stored potential encounters 556. There may or may not be an additional charge for these, however, they will very likely be posted on an online user account which is password protected for exclusive review by the MMx member. The in-field hits logged at 194 can be later accessed in various forms by the MMx user and in some cases used to modify or enhance his MMx encounter performance. He can, for example, vary his primary encounter venues by examining his historic routes compared with those of others. If they also sufficiently match his "WHAT I WANT" criteria he can be placed in contact with those parties as explained later in this drawing description. If the accessed data originates from his originating database (data for which the requesting member is already paying), then there is likely no charge for decoding and viewing that content. However, if the requested data is proprietary to a secondary database, then it is possible the requesting user will be charged a fee for the later decoding and viewing of that data, and the owner/operator of the secondary database may be compensated accordingly. In certain cases, it will be up to the originating database owner/operators to inform their members when personal data about them from actual in-field encounters is purchased and viewed by other MMx members. This would be done in accordance with each database's subscriber agreements and privacy policies.

Fundamental to aggregating databases through proximity communications is the collection of membership fees or the selling of advertising space for basic MMx services, together with the optional collection of fees for consummating any non-proximity electronic encounters. The payment of a percentage of collected fees, at 195, to the originating database owner/operators enables a viable new business enterprise and a unique service at a very low cost for data acquisition since the database already exists. Google, for example, is an aggregator of public data. It scans and compiles data under proprietary software and makes this data available without cost to any consumer who visits the Google web site. To generate profits, Google utilizes an advertising model. MMx is an aggregator of multiple, independent, competing, commercial databases which can be structured on either a membership model or an ad-supported for-profit model. But unlike Google, participating MMx databases may contain highly personal, or even secretive data, as opposed to public data. When MMx uses or distributes such data in the field, it can both track and compensate the original owners of that data at the time of each occurrence. Although one preferred embodiment for MMx describes a subscriber/fee revenue model, MMx also adopts an advertising model for all or part of its operations. Regardless, it is anticipated that the aggregation of established databases and cash flow from the distribution of hyper-relevant advertising and the sale of broad-based MMx-generated in-field data will support the subsequent creation of numerous unique and specialized databases as part of a growing MMx enterprise.

When illustrated from a consumer's perspective, the steps described in FIG. 2 might go something like this: A teenage girl, who is already a member of MySpace, the popular social networking web site owned by News Corp., notices an advertisement for MMx while on MySpace. MMx is described as a new kind of mobile product that will allow her to hook up with her special friends (some of which may be MySpace members) while she is away from her computer—in fact, when she is out in the world going about her daily routine. Intrigued, she clicks on the MMx ad, unconcerned as to whether the MMx ad space has been purchased and paid for by the MMx entity or has been embedded in the MySpace environment as a result of an ad purchase, a member page, or a joint venture between MMx and MySpace. Regardless, when she clicks on the ad, it links her immediately to the MMx web site, where she is presented with a demonstration of the product, together with exciting case studies showing female teens, like herself, how MMx brings the MySpace experience into the real-world of wireless electronic encounters. Again, she is unaware that her own basic profile demographics may well have been used in the selection of ad content depicting female teens as ad content in her initial MMx exposure. Excited after viewing the presentation, she clicks on the link to register for a FREE MMx mobile device and membership. She is now presented with a membership page that includes an easy-to-complete form in which she provides her name, address, and other traditional kinds of personal identification, which may also include her Social Security Number, driver's license number, and possibly credit card information. However, she will not be billed because registration is free. The MMx entity also promises to keep all her personal information strictly confidential. When she is finished, she clicks the SUBMIT button and waits, unaware that the MMx system, at its early stage of deployment, is evaluating FREE applications to be sure that there will always be large numbers of approved applicants in specifically targeted age and demographic categories, as well as in targeted Zip Codes. Indeed, MMx's initial free Introduction marketing strategy is to make MMx's free availability known to large groups of potential users by Zip Code to assure that early adoption will be in areas of adequate densities for proximity users. In a few moments—about the time it takes to receive an online credit report—she is approved to receive a FREE MMx and is given the names of participating retailers near her, including a Best Buy store in her own neighborhood. She is next presented with an encoded certificate good for the receipt of a single FREE MMx mobile handheld and is given instructions to print this out and take it her nearest participating dealer. She is also offered printable bonus coupons which will allow her to purchase additional MMx mobile units for a low introductory price (with perhaps a limit per buyer) which she can then gift to her friends and family. This offer is accompanied by promotional discounts on certain types of memberships and accessories and an account credit whenever one of her friends signs up for an MMx in her Zip Code using her name. Meanwhile her local Best Buy store benefits from heavily increased traffic and the sale of additional MMx units and accessories at full retail.

At home, she unwraps her new MMx, places it into its charging dock and connects the dock to her computer using its supplied cable. Immediately, the MMx portable takes her Internet-connected computer to the MMx home page, where she is able to sign in using her previously established user name and password. She is now given the opportunity to complete her registration process through a thoughtfully designed, easy-to-use web format. Step one is to finish her "WHO I AM" profile. She's heard from close friends that it is very important to be honest in all of her answers to profile questions, whether they require yes/no, multiple choice, or word/text responses. She is guided by the site in completing her brief, simple answers and is constantly reminded to not complete this important profile with any particular objective or outcome in mind—that this initial profile is intended to define "who she is" and must never be slanted to achieve any particular result or goal. She notices in completing her "WHO I AM" profile that many of the questions have little to do with her actual interests or experiences. She is unaware that these questions have been constructed by experts in human psychology and behavior and have been carefully designed using proven techniques to yield answers that can accurately reflect a person's real character, values, interests, and abilities, even with individuals having diverse backgrounds. She is also unaware that these psychological profiles will be combined with her directly-stated responses about "who she is" and will be encoded to deliver a composite profile which is unique to her yet is one that has been reduced to a common numerical language encoded to correspond to MMx's standard for matching electronic encounter candidates, regardless of their originating databases. As she develops her profile, she is further assured that she can save her in-progress efforts and resume work later anytime she wishes. She also notices that with continuing progress some interesting things begin to occur. For example, as she selects the kinds of movies and books she enjoys—by writing these titles into her profile—various characters and images from these favorites surprisingly appear to both guide and entertain her. At one step she is asked to put a check mark by any current movies she's seen, to check off any movies she's seen more than once, and is asked if she'd like to rate them on a scale of 1 to 5. At times the MMx system even suggests other types of entertainment she might want to list based on the interests she's stated thus far. If she responds by showing no interest in these alternatives she might next be asked why she feels that way, not realizing that even her negative answers are leading to other fruitful realms of questioning. Indeed, although she is unaware of the exact way MMx is processing her responses, she senses that allowing MMx to learn about the experiences she does or doesn't enjoy is critical to MMx's ability to deliver satisfying, life-enhancing experiences in the real world. She also begins to understand that while certain questions seem directed towards her and follow a specific line of thought, they are quite likely different from those being asked of others. As she completes another section—this time on restaurants, cooking and favorite foods—she is again surprised by the appearance of tiny icons offering discounts and two-for-one deals at some of her favorite places, as well as a few new and exciting ones. Most are from restaurants or special markets right in her own neighborhood, but all specialize in the kinds of foods, meals, or experiences she has expressed interest in. Such icons can be printed out as coupons which she can to take with her—even better, they can be reproduced on the display of her MMx the moment she enters those establishments. Importantly, these offers are never intrusive to her profiling process—quite the contrary, they motivate her by producing curiosity and intrigue. She soon discovers that MMx can alert her not only to the presence of people who share her values, interests, and experiences, but also to nearby places that can bring a variety of genuine benefits into her life.

After an hour or so of working on her "WHO I AM" profile—and now excited about moving to the next phase—she saves her progress and moves to the next fun section of profiling: "WHAT I WANT." Here again she is guided in easy responses and is told why there are multiple levels to her "WHAT I WANT" profiles. The first is a more general profile designed to uncover her broader expectations in life—for example, what she wants out of it, from her career, her relationships, her education, or her family. In completing her "WHO I AM" profile on past relationships, she recalls being asked if she's ever been married and now, if she'd care to engage in a few brief questions on her views of divorce and separation. As she continues with her responses she realizes that her "wants" fall, indeed, into two categories: (1) broader life or long-term expectations, and (2) more focused, specific, near-term "wants" and "needs." Here, she is shown how she can engage with profiles developed by hundreds of dedicated users who all share her common interests and objectives—established "communities" for such categories as "Hobbies & Collecting," "Personals & Dating," "Business Networking," "Friends & Family," "Arts & Entertainment," or simply "Wild Experiences!" to name but a few. Being an online gamer, our teen spots a community called "Second Lifers", an MMx registry based on the popular online virtual world site "Second Life," run by Linden Labs. Here, SL participants can register their avatars, and then, thanks to MMx, can be introduced on the streets of the real world to the real people behind their virtual world characters.

Later, she is shown how she can create and launch such communities of her own—based on her own unique interests and experiences—which others can then join.

Being a MySpace member, she is given the opportunity to click-on and add MySpace friends to her MMx encounters community. That way, the next time she's out and about, she'll be alerted when those friends are close by, as long they remain checked in her list of preferences. But she soon learns MMx works differently from Friendster or MySpace, because it doesn't allow others to view her personal pages or gain access to her personal account. Everything is password protected.

Even her MMx handheld device is password protected with a time-volatile memory to prevent others from using it if it ever becomes lost or stolen. Security is managed through her home computer and can be customized whenever she goes online.

She also finds that "friends" can't be randomly linked to her encounter lists. Friends on MySpace—as with most social networking sites—are not always real friends, at least in the traditional sense. More often, they are "friends of friends," who are not even intimate or close. In fact, research reveals that MySpace members wouldn't even bother to cross the street to meet most of the "friends" on their lists if offered the opportunity through a proximity encounter. By contrast, MMx encourages its users to list only genuine friends, and to thoughtfully define all the new kinds of friends and experiences they want in their lives. Our teen quickly realizes that one of MMx's most outstanding features is its ability to relevantly match the true interests and desires of its users on multiple levels—to sort through diverse issues and subjects and make psychological assessments—and to identify user intentions that are frequently hidden or masked, even in their direct responses to personal questions. Such analysis assures more relevant and rewarding personal encounters.

MySpace has been described as the online equivalent of your high school lunchroom, your college quad, or your favorite bar. It doesn't sell much, it's simply a place to hang out and express yourself. Its core users—teens and twenty-somethings—post profiles decorated with photos, music and video clips, blogs, and various links through which they express themselves and attempt to attract and impress others. Today it is comprised of 100 million users. As a result, sites like MySpace and YouTube (the latter specializing in consumer-created video) are frantically congested and difficult to search for meaningful content. Thus, MMx emerges as a powerful "search engine" for these crowded virtual worlds. It becomes an external avatar which can first aggregate and organize the local content, then filter and present it in terms of the interests and objectives of individual MMx users. MMx makes order out of the chaos by extracting what our teen wants, then delivers it to her as she moves about her real world—or her online world—at times, she can spontaneously engage, but only at her sole option.

On relationships and dating, she learns MMx can access such popular sites as Match.com, Yahoo Personals, Friendfinder, or eHarmony.com by adapting diverse profiling methodologies into a common numerical language, so that by joining just one site she gains access to all.

At the end of her first day of use, she plugs her MMx into its dock to recharge. As it recharges, it downloads her new encounter candidates who match the "WHAT I WANT" profiles in her active communities. It also uploads her in-field hits from the day: her consummated, declined, or stored encounters; any communications between her own MMx and a variety of mobile or fixed objects which may have presented her with displayed content or captured her video image that day; and, perhaps most importantly, all of the communications between her personal MMx and the MMx devices carried by others.

While this is happening, her computer screen loads with MMx "surprise pages," which are generally categorized under the various communities she has set up. These pages assume a variety of formats which she is able to choose and control on her own. They are fun, entertaining, and contain ads—typically video commercials—which have been created, personalized, and delivered to her home computer based entirely on her in-depth personal profiles. On her start page, she finds six to eight YouTube-style click-to-view videos, which are essentially 30-second spots created and placed for the major brand advertisers, each containing content that is hyper-relevant to her personal tastes, interests, and desires. When she clicks to view these ads, each click is time stamped and the ad viewing is confirmed via the Internet at the MMx Central Controller, and subsequently to its paid advertiser. After viewing these targeted spots, she can click and view again, she can request more information or order products, she can be transferred to that advertiser's web site, or she can email the video ad to her friends. In every way, however, from the privacy of her own home, she is viewing commercials, the content of which has been "requested" by virtue of her "WHAT I WANT" profiles.

MMx is a targeted ad distribution platform through which marketers pay for the right to upload content and promotional materials, which have been developed from detailed demographic profiles, to interactive private channels directly to those consumers they wish to reach. In so doing, they get all the measurement trappings of their very own hosted web site, one which also lets consumers interact with their brands by letting them request more information, buy instantly, leave feedback, send content to friends, and essentially bask in total brand immersion. This is clearly the most effective kind of advertising.

Our teen can return to her surprise pages any time she wants. She can save or download commercial content or videos and send these to anyone on her friends list or in the address book of her computer. When she moves from her home or profile pages and enters, for example, one of her "relationship communities," she might again encounter fun, entertaining video ads or pages, but these will relate to the subject matter she is then involved with. If the subject is dating, then ads might be for cosmetics, fragrances, and apparel, products that bear on her relationships, products she is currently using or is likely to become interested in using based on her profile responses.

Once uploaded, all of her day's encounters—or near misses—can be viewed with respect to her daily route or by Zip Code. MMx is able to display her general route to work or school superimposed on a map of her Zip Code. She can click on one button and see the general density of MMx users operating in her area. She can click again and view the daily paths of only those MMx users who match her personal profiles or "want" lists, or those who share an interest in the same communities. Here, her actual encounters, her near misses, or her declined or stored encounters can be also revealed. Any time she wishes, she can be put into direct contact with these other MMx users online, providing that these users have authorized post-proximity contacts with other parties, and that such contact follows the preferences set forth in their profiles. If that other user happens to be a paid member of a non-MMx database—of Matchmaker.com, for example—then the contact might also involve payment of an online contact fee (a "finder's fee") by the requesting user collected by MMx, with a percentage paid to the originating database, Matchmaker.com.

If our teen travels consistently to other Zip Codes, MMx will automatically add these to her primary encounter area. If she anticipates travel well beyond her Zip Code, she can add these Zip Codes using her Travel Planner in advance of her trip. This way, encounter candidates that match her specifications will be stored on her MMx device's hard drive before she departs on her trip.

While MMx is uploading new data to her hard drive, it is also extracting, without her direct knowledge, all of the data stored in the memory of her MMx that relates to any communications her unit has had with all other MMx units in her area that day. All of this information is sent to the MMx Central Controller, where it is decoded in a nonspecific format and is converted into a data matrix showing the movements of all of MMx users within specific regions, by demographic category, by time, and by place. Such movements are then reduced to User Codes and interpreted in accordance with MMx marketing and research criteria, either by Zip Code or as otherwise requested by MMx marketers. The sale of such bulk data relating to the mass movements of MMx users to advertisers, retailers, and developers is another primary source of cash flow to the MMx entity, in addition to the placement of commercial ad media.

MMx is an aggregator, manager, and filter for a new breed of online consumer. It provides a safe and exclusive venue for consumers who can no longer tolerate the inherent disarray of user-generated content, as well as for marketers who have grown increasingly aware of their need to reach targeted consumers effectively without exposing their brands to unacceptable content.

Figure 3:
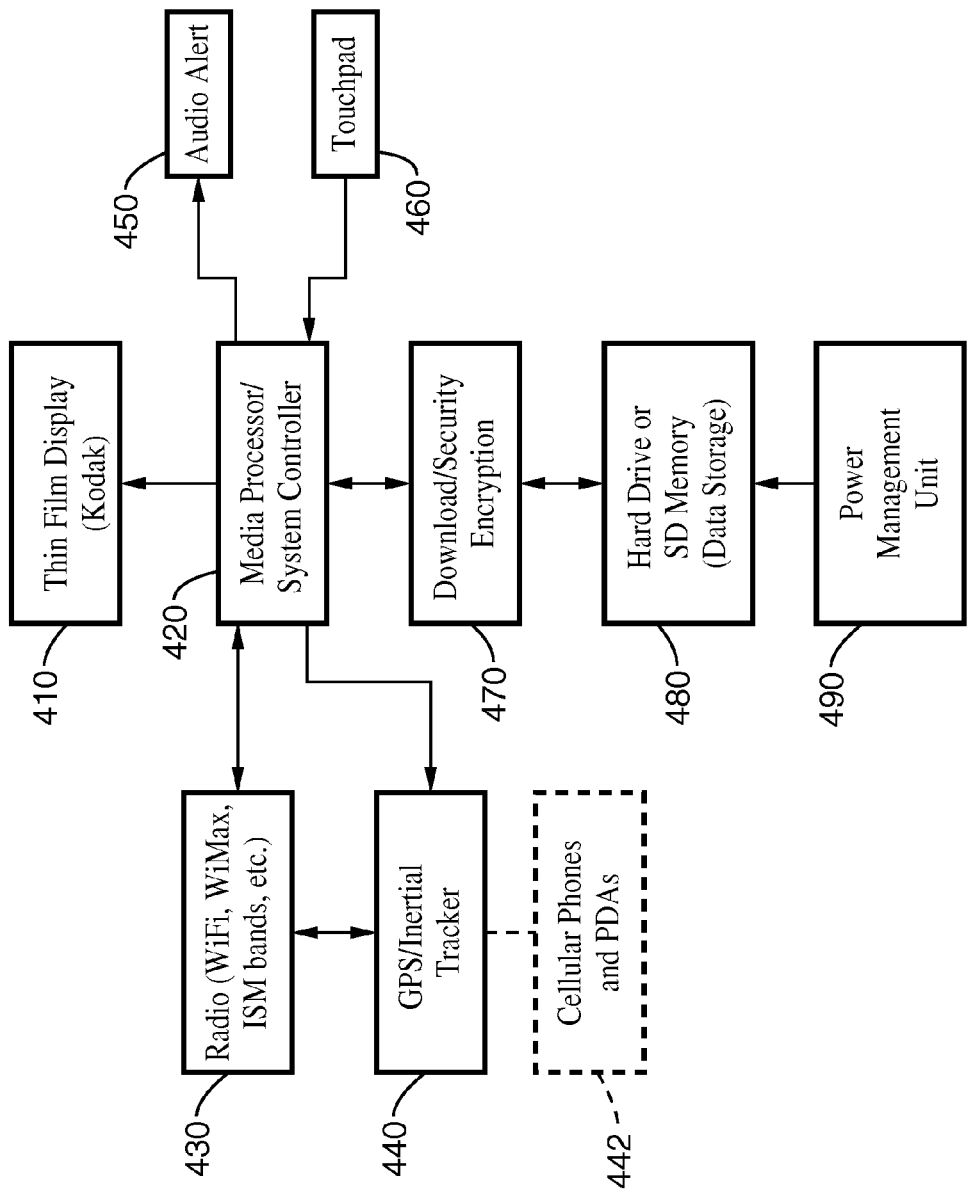
FIG. 3 is a block diagram of an embodiment of a basic mobile product according to the present invention.

FIG. 3 summarizes the basic MMx Mobile Unit 400 in block diagram form. This unit is a simple handheld product comprised of the functional elements necessary to store, decode, and process data for display on a video screen. It additionally comprises a radio transmitter/receiver for sending and receiving encoded data, a means for detecting and decoding said data, an audio tone, a heat generator or vibrator to alert its user, a command input touchpad, a geo-location device, and batteries to power these components. As with any cell phone, PDA, or digital MP3 player, the basic MMx mobile product can be executed in many variations and can contain numerous features. The essential elements for use by the consumer however are the video display 410 and the touchpad 460. These can be combined into a single component (touch screen) in which control functions are superimposed onto a display which is touch-sensitive. An alternate option is the use of soft keys, typically placed near the edge of a display window so that their functions can change with any operating mode or image displayed on the screen. All such functions are found on today's cell phones. Products such as the Apple iPod could easily be converted for use with the MMx system. Initial versions of MMx products may themselves resemble a slender iPod or a simple PDA. Future products would grow consistently smaller, slimmer, and physically flexible. Some may include pull-out flexible display screens. It is anticipated that with increased power efficiencies, storage, and miniaturization, future MMx handhelds may resemble something akin to a thick credit card.

Unlike a cell phone, iPod, or PDA, the basic MMx mobile device is at most times passive. It is carried by a user in much the same way as a wallet or a woman's compact, in a pocket or purse. Once NID Personal Profiles are loaded into its hard drive 480 or into a solid-state SD memory of appropriate size with the unit is switched on, the MMx mobile device will, for the duration of its battery life, search for unique communicating signals from other MMx units within the broadcast ranges set by its users. Broadcast ranges are resolved at radio transceiver 430 and are selected or changed during mobile product setup online or by using the MMx touchpad in the field.

When a unique signal is detected from another MMx, it will be received by antennas contained within radio transceiver 430 and forwarded to its media processor/system controller 420 where it will be compared with stored codes that identify the nature and specifics of any data stored on hard drive or SD memory 480. If a matching code is detected and subsequently confirmed between two or more MMx mobile units, an audio alert is generated at 450 announcing to the users the potential for an electronic encounter. MMx users will then use touchpads 460 and displays 410 to review initial stage data. They will then either "escalate," "terminate," or "store" the encounter opportunity. The terminate/escalate/store selections are made by each user in turn at touchpads 460. If terminated, the event is recorded at data processor 420 and stored on hard drive 480 for later uploading to the user's home computer. If the encounter opportunity is stored by the user, this request is time stamped, identified by code, and stored on a hard drive or SD memory 480 for future review by the user. If, instead, the encounter is escalated in accordance with the Encounter Protocol described in FIG. 4, then that selection is input at touchpad 460 and confirmed at data processor 420. When matching codes are accompanied by an escalate command at data processor 420, the data associated with that code is subsequently decrypted in stages at 470 (explained in more detail in FIGS. 4A-4B) and is presented on video display 410. At the same time, a radio signal confirming the "escalate" response is sent via radio 430 to the originating or communicating MMx unit. Once the signal is received at the originating unit, this decision making process is repeated by the originating MMx user who is given the same three options: to either escalate, terminate, or store the encounter opportunity.

Whenever a user escalates (in accordance with the Escalation Protocol in FIGS. 4A-4B), additional data is decrypted and released from the appropriate internal MMx hard drive and is then displayed on the receiving video screen(s) for further action. The final stage of the escalation process can, if the users desire, reveal the physical locations of one or more MMx mobile units within the communications area. In one version of the preferred embodiment, a final stage escalation signal is sent by data processor 420 to a GPS/inertial tracking system which can combine RF and ultrasound locating features, at 440, where, via radio transceiver 430, a relative position indication is generated for each MMx mobile unit involved in a specific encounter. These relative positions are then processed at 420, exchanged between the MMx units involved via their radios, and are finally displayed for their users at 410. The power management unit 490 delivers the necessary power to all internal circuitry and will be comprised of the most cost-efficient rechargeable battery packs or power cells.

FIGS. 4A-4B summarize, in steps 510 through 590, the basic MMx Encounter Protocol. An encounter can begin once a user has downloaded encoded/encrypted NID Personal Profiles 170 into the memory of his MMx mobile unit 400. When switched on in the field, an MMx mobile unit will, at 510, broadcast a signal over user-selected ranges or over consumer-selected wireless means which may include radio frequency (RF), ultrasound, or infrared. It should be added that MMx units can conceivably be designed to utilize a variety of RF modulations and, therefore, convergence with cellular telephones and similar technologies is quite possible. Ranges may extend from as much as a mile down to a few feet, to something comparable to the interior of a large room. The objectives of such broadcasting are first, locating another MMx unit within range, and second, receiving a confirming signal from the other MMx unit that would indicate the potential for an electronic encounter. A confirming signal indicates the existence of specific, mutual matching codes based on profiles stored in the communicating MMx units. These codes are referred to herein as Personal Data Codes, or "PDCs." When a mobile MMx unit detects an incoming PDC, it will at 530 search its internal hard drive for a matching PDC. When a matching PDC or PDC combination is detected, the MMx unit will decode and release for display certain "first stage" encounter information such as age, gender, and other basic, general information relating to the primary specifications set forth by each user's first stage disclosure preferences. PDCs will also contain security confirmations (certifying the veracity of data) and a pre-established contact protocol generally dictated by preferences selected on the member's MMx master profile. Even before users are aware of their contact opportunity, this initial linking of PDCs, at 540, will establish the nature of the Encounter Protocol. Based on these predetermined preferences (selected and contained in their respective master online profiles and included in their PDC), users will be advised either simultaneously or in sequence of a unique encounter opportunity. Preferences may vary depending upon the nature of the encounter. For example, if the encounter opportunity is in the area of Personals/Dating, the predetermined connecting protocol might favor the female user out of considerations for safety and security. A mutual invitation for an encounter would thus first be presented to the female at 545, before the male user is even alerted to the possibility of an encounter. In a second example, a potential employer, while in the field, might be alerted to the presence of an individual matching his exact specifications for a position, however, that employer may be occupied at the time and unable to accept the invitation for a spontaneous encounter. The employer might instead elect to store the PDC relating to that encounter so he can follow up and make contact through conventional means at a later date. In a third example, two or more individuals in a convention hall might share identical interests, such as being traders in rare stamps. In this case, their predetermined connecting protocol might not favor either party at 545 and would simultaneously alert all of the MMx units having the same or similar PDCs the moment they are received. In a fourth example, a military officer in a battlefield situation might be alerted to the presence of another officer or an enlisted man having certain valuable skills, intelligence, or knowledge; in such a case the protocol might be preset to favor the ranking officer.

In order to protect the privacy of users and to optimize the quality of encounters, the data stored in the memories of MMx mobile units is decoded and presented for a user's review in progressive stages. As previously mentioned, in a preferred embodiment, at 550, every user is given the opportunity to assess newly presented data and to then make a "go" or "no go" decision using three basic commands: (1) terminate, (2) escalate, or (3) store. If, after reviewing stage one profile information which has been decrypted from a sending MMx unit, the receiving user decides this is not an encounter he wishes to pursue, he may elect to terminate the potential encounter at 552. At that point the sending MMx user may or may not be advised of such termination depending upon his preset protocol preferences. If the sending user in his protocol preferences has elected to be informed of any terminated (rejected) in-field encounters, he may be later advised of such close encounters when he uploads his contact history at 192.

If a user is unable or unwilling to pursue a proposed encounter at the time it is offered, he can opt to store the encounter information for later follow-up as shown at 556. When encounters are aborted in this manner it is generally best to withhold for a period of time any information concerning the declined encounter to preserve the in-field rights and confidentiality of the declining user. Although there can be exceptions governed by differing encounter protocols, all of the parties involved in such close encounters can be so advised after the fact at their respective member web sites. Should one party later request information on another party resulting from a matching PDC, that party might be allowed to purchase that information for a fee, depending upon the privacy policies and the subscriber contracts of the member's originating database. If any fee is collected, a portion of that fee could be paid to the purchasing member's originating database under a preferred embodiment. In other instances, MMx users might allow spontaneous encounters in the field yet prefer—and so specify in their operating preferences—that specific details or contacting information not be shared with those same MMx users at later dates or through conventional means. In general, a preferred MMx business model presumes that, if proprietary information is disclosed to a paying member from an established (but non-MMx) database, then the owner/operator of that database is likely to be compensated by the MMx Database System for the release and use of that information. In other embodiments, this may not be the case.

If at 550, a receiving user elects to escalate (in this case, accept) an encounter invitation based on a matched PDC as shown at 554, he will input this command using touchpad 460, causing stage one NID Personal Profile information to be released at 470 from his own unit's memory 480 to be presented on his own unit's video display 410. The release of such first stage data from stored NID Personal Profiles on a receiving MMx unit is shown at 560 in FIG. 4B. Depending upon the predetermined Encounter Protocol, a signal inviting mutual escalation (in this case, an acceptance) of the encounter is immediately returned at 570 to the originating MMx unit via transceivers 430. This acceptance is processed by the originating MMx unit at its data processor 420 where, based on the same PDC, it decodes and decrypts at 470 stage one information contained on the internal hard drive of the originating MMx 480, allowing that data to be presented on the display of the originating MMx mobile unit. Simultaneously then, both the originating and the receiving MMx units generate at 450 an audio, visual, vibrating or heat alert thereby advising their respective users of the mutually accepted potential encounter.

In FIG. 4B at 580, the originating user, in accordance with established protocol, now has the same option to terminate, escalate, or store the proposed encounter opportunity. If the originating user decides to escalate (in this case, accept) the proposed encounter, then the process is repeated alternately between the two (or more) MMx users until, according to protocols, there has been a sufficient release of information to facilitate an actual physical contact.

In FIG. 4B at 590, each user has decided to consummate a physical encounter. The final step is for the parties to agree on a time and place. The time will usually be in the present, since spontaneity is the inherent nature of proximity encounters. The place is likely to be in the general contact venue, which typically corresponds to the user-controlled broadcast range of the MMx mobile units involved. Typical venues could be restaurants, shopping malls, sports arenas, or other public or private places and could be either indoors or outdoors. Also, because the MMx units do not require the use of conventional infrastructure to communicate, isolated venues such as forests, deserts, mountains, or bodies of water are operable. Another aspect of this invention is based on the convergence of the MMx system and apparatus with other common forms of communications such as laptop computers, cell phones, and PDAs. This interface is indicated in FIG. 3 at 442. An obvious means to coordinate a physical encounter would be for one MMx user to release to the other his cellular phone number so that the parties can converse and arrange for a nearby place to meet. Since many cell phones are increasingly equipped with GPS capabilities, such features can also be successfully merged and then utilized to identify the relative locations and ranges between the involved MMx devices. If MMx system hardware is integrated into future cell phones (or conversely, if cell phone circuitry is integrated into an MMx mobile unit) then direct voice communications or the geo-location features inherent in those products could enable the final stage contact as shown at 590.

Another method of facilitating the disclosure of a physical location is for the participating MMx units to guide their users towards a common physical point in the contact area, or towards each other. One simple method of implementing geo-location is to incorporate GPS chips into each MMx unit, as shown at 440, in FIG. 3. GPS chips would identify the locations of the MMx units involved and then MMx software would calculate and present their relative locations through graphics presented on their respective video displays, 410. A basic procedure for enabling this is for each MMx unit to use GPS to determine its own location and then use its internal radio to send this location to the other communicating MMx unit where it is displayed on the opposing unit's display screen. GPS, augmented with inertial guidance chips such as those utilized in the handheld guidance products manufactured by: American GNC Corporation, 888 Easy Street, Simi Valley, Calif. 93065 (phone: 805 582-0582). Such guidance chips would add to a MMx mobile unit the ability to track its location even while indoors (where a GPS updating signal might not be received). An alternative locating method would use transponder technology to triangulate the relative positions of the MMx units involved and then interpret these into a simple graphic map on the concerned video displays. Yet another method for close quarters is to use radio-frequency transmissions or ultrasound to determine heading and azimuth to the opposing MMx unit's location by measuring differentiating signals arriving at the respective handheld's antennas. In MMx high-density use areas, such as on college campuses, RF triangulation can be used to identify the position of non-GPS-equipped MMx mobile units. Another method is to position relatively short-range, fixed transmitter/antennas and repeaters within areas to broadcast position information to passing non-GPS-equipped devices. This method would work well on major highways or freeways. Yet another method for identifying position is to allow GPS-equipped MMx unite to broadcast their positions to all nearby or passing non-GPS-equipped MMx devices whenever they broadcast their user search codes.

To summarize, a typical electronic encounter by a female user in the Personals/Dating category might go something like this: The young lady drives into the parking lot of a restaurant intending to meet her girlfriends for a drink. As she parks her car, the leather-bound MMx in her purse emits a soft tone alerting her to the possibility of an encounter. Seated in her car, she flips open its slim case and runs her thumb across the corner of its flexible screen. It activates and she inputs her password on its touch-sensitive surface. A cleanly formatted text page announces that somewhere nearby is a gentleman who matches her precise qualifications as a potential romantic partner, and the page goes on to display her prospective partner's key qualities, all arranged in her own preferred order of importance. She notes that he has an MMx Platinum Seal next to his name, which means that his credentials have the top veracity rating. She closes the MMx case, deciding to take the next steps in the company of her girlfriends, who should be waiting for her inside the restaurant. She joins them at their table and tells them about her imminent potential encounter. Excitedly, they gather close as she re-enters her password and reactivates her screen. Together, the three ladies scroll, sometimes giggling, through screenfulls of text that describes her "perfect" mate. One of the ladies eyes two cute guys seated separately at the bar and challenges her friends to guess which of them is that perfect match. With bets placed, she presses the "accept" key on her touch screen. The women watch, but neither of the two men reaches into a pocket to pull out an MMx. Her friends joke about how her innermost desires have just been sent to the Internet where next day they'll appear on some "desperate daters" weblog. Suddenly, there's another tone and her screen glows with the words, "encounter accepted!" A moment later, her screen is filled with a photo of a very handsome man followed by more detail on the areas of interest that are of the highest importance to her (his type of work, his marital status, his devotion to family). She touches the screen again, this time countering his acceptance with another of her own . . . . aware that she has just allowed MMx to release preset preliminary information about herself to the semi-stranger . . . . She does not know exactly which information is released, other than knowing it had been previously approved by her and will be delivered in the order of greatest importance to her encounter partner . . . but she also knows it didn't include a photo. He does not ask for one. Seconds later, another acceptance appears and she is presented with two choices: (1) disclose her cell phone number, or (2) disclose her location. She is with her friends, so she presses the "disclose location" icon on her screen. Five minutes later, the handsome man in the photo appears at their table. He turns out to be the restaurant owner, who was in his office upstairs.

FIGS. 5A, 5B, and 5C depict the invention's Member Profiling Model. This block diagram summarizes the essential steps in becoming a member of the MMx network, starting with establishing a user account at 1200, where new customers submit their credit card information, along with a billing name and address, then create a user name and password and engage in other account activities common to traditionally accepted online business enrollment practices.

Next come a pair of essential steps in using the MMx service, the creation of two confidential NID Personal User Profiles: (1) a master "WHO I AM" profile 1210, and (2) a "WHAT I WANT" profile 1220. It is believed that MMx encounters can be reasonably defined by these two basic information groups and that these key categories can shape the nature and content for nearly all user electronic encounters throughout the MMx system, although there are certainly alternative and specialized situations. Each profile is completed privately by having new members answer a series of clear, simple questions about "who they are" in life and, at this particular juncture, "what they want" out of it. Each profile is completed separately—with the "WHO I AM" profile completed first—in a step-by-step, clearly guided online Q&A session including multiple choice and unstructured text responses designed to help individuals to better know themselves as they organize their long- and short-term personal objectives in terms of the MMx services desired. At 1210, new members follow mouse-click prompts and execute multiple-choice or write-in-the-box unstructured responses to format questions defining—to their own satisfaction—their most essential and critical personal characteristics. This is not so much a process of traditional individual identification (name, address, age, education, etc.) as it is a kind of insightful "DNA" code into one's own persona, character, and belief system.

The "WHO I AM" master profile 1210, is the way a person defines or sees himself—his most intimate, personal self—as a person, his place in life, his beliefs, convictions, hopes, dreams, morals, values, his intellectual, spiritual and physical attributes, his skills and knowledge—all the ideals, ideas and life experiences that make us who we are to ourselves and to others around us. The clearer, more honest, and more thorough individuals are in defining themselves when completing their "WHO I AM" profiles, the more relevant and meaningful all of their future encounters will be using the MMx system. Importantly, the "WHO I AM" profile should, in most cases and in the preferred embodiment, be the first profile completed by a new user and should be executed free and clear of any "WHAT I WANT" profiling. This is to discourage applicants from deliberately slanting or enhancing their personal descriptions towards a particular want, need, or objective. The methods for creating the necessary information-gathering tools and the formats for eliciting the appropriate responses from participants are well known to professionals in the fields of psychology and recruiting, as are the methods of quantifying, weighting, characterizing, prioritizing, integrating, and ultimately analyzing the end results. Also commonly understood are the methods and procedures for encoding and encryption of this data once it is identified. It is not the objective of this invention to reinvent the ways we derive our information, but to introduce novel ways to gather, assess, present, and apply it in our personal encounter relationships. Thus, the term "Permissive Mind Reading."

In FIG. 5A at 130, the "WHO I AM" profiles 1210, and the "WHAT I WANT" profiles 1220, are analyzed for hidden relational values and meanings utilizing proprietary deep-search software (previously described) to identify personal characteristics individuals are either unable or unwilling to define for themselves. Later, these findings are confirmed or modified by a user's actual performance in the field.

When a user signs on to his private MMx pages, he is, in most cases and under the preferred embodiment, presented with hyper-relevant advertising. A user, however, will always be presented with a selection of suggestions and helpful information which relate to his past performances, purchases, preferences, or in-field histories while using the system. In much the same way as Amazon.com welcomes users by their first names and with suggestions for new purchases based on past purchases—or based on the purchases others have made who have similar backgrounds and interests—MMx will display animated reminders encouraging its users to add to or enhance their unique profiles so that MMx can deliver a more satisfying experience. As a user defines himself and later evolves his "WHO I AM" and "WHAT I WANT" profiles online, he is also likely to be presented with compelling alternative suggestions, personal videos, and other communications which are directly related to his profile inputs, especially when he is engaging with an ad-supported format. Such features add fun and entertainment to the profiling process while, at the same time, offering a more personalized experience.

Importantly, performance profiles are never released to the consumer, but are held in a highly encrypted form, unreadable and secure within the MMx Database System at 300, inaccessible to all but the individual who created it, and then only for the purposes of modification or deletion. All information is input privately, solely by the consumer using his own computer. There is no need for the consumer to wait for "Pending Photo Approvals" by system administrators or for conformance with site "Standards & Practices", because all consumer-generated content is confidential, and viewable only by its creator unless that individual allows others to see the content he has created. If the member later expires, terminates his account, or the account becomes inactive or dormant, the information is automatically erased. Members may retain an encrypted copy on their MMx hard drives, but these can be read only by MMx online Central Controller software or during an actual in-field proximity encounter by and between authorized MMx mobile devices.

In a preferred embodiment, the information requested of the consumer is further staged in three levels of detail, each level containing information that is richer, more revealing, deeper, or of greater significance than the previous. These three levels govern the disclosure of personal information in the field. Each user is so informed and prompted as he completes his "WHO I AM" and "WHAT I WANT" profiles. During an actual encounter, each of these three levels conforms to the MMx Encounter Protocol 550, which requires at each stage that a user either (a) terminate 552 (decline to release more); (b) escalate 554 (authorize the release of more); or (c) store for later use 556 (suspending the further release) of NID Profile information. The voluntary release of all three levels of information (with each step properly controlled by their owners) will or should be sufficient to enable a safe and proper physical encounter decision at 590.

Once a user has completed his "WHO I AM" master profile 1210, he is invited to proceed with a relatively general "WHAT I WANT" profile 1220. This profile lets a user define his general areas of interest in terms of encounters, along with his preferred method of execution. Like the "WHO I AM" profile, the "WHAT I WANT" profile is an easy to complete, guided, online procedure through which a user determines the various types of encounters he desires (Personals/Dating, Employment, Buyer/Seller, Special Interest, etc.) and then selects, from the options available, the best ways of making these encounters work for him. In the interests of providing a secure, worthy, and reliable service, users are invited, at 1230, to voluntarily submit confidential information about themselves for confirmation by an MMx Security Unit at 1240. In all likelihood, this will be an optional and separately paid for service. Its application to the consumer would be not unlike a consumer credit report or a check of resume credentials, after which a score is applied. Such scores will then be resolved in terms of an "MMx Certification," for example, a score which aptly describes the quality, accuracy or value of the information presented, and thus indirectly rates competency, honesty, and integrity of the individual(s) and, therefore, the quality of a potential encounter. An example of this in a preferred embodiment might be as follows: A Platinum Certification would represent the highest MMx rating and a "Platinum Seal" would be attached to this individual's file when decrypted; a Gold Certification might represent either lower scores or less stringent checks, or both; while a Silver or Bronze Certification might represent less still. An individual having no Certification at all could mean "buyer beware." Another possibility for rating members, at 1250, would involve "Certifications" by the members themselves. Such Certifications would be bestowed by members who are already Certified. They could then authenticate another member who is known to them to be "real" and credible. All such awards would be monitored. If a Certified member was eventually found to be unworthy of his award, then both members might lose their Certification status. Clearly, the success of the present invention is driven largely by the integrity and dissemination of its data. Thus consumer "trust" for the system and its process of matching users for real world encounters is essential.

At 1260, a user will define his ordinary and extraordinary anticipated encounter environments and locations. He will be asked to identify his normal daily or weekly encounter realms (for example, by Zip Code), his neighborhood, his daily transportation route, his business, or his learning campus, all areas that are normally traveled which are potential encounter venues. He will also be asked to identify the areas to which he travels less frequently, such as vacation spots or on business trips, and the timing of such trips, if any. When a user from one city is planning a trip to another city or country, he can input this information along with his schedule into the MMx Travel Planner 1260. Prior to such trips, the MMx Network then automatically extends a user's online database search realm to include those cities and countries he is traveling to, providing he has authorized this in his General Profile preferences at 1220. This same feature works when traveling MMx users are visiting your home venue, since visitors to your city or country may have been alerted to your presence and your interests in preparation for their visit. An MMx member operating in a Personals/Dating Profile, for example, might schedule two kinds of potential relationship encounter partners: one for short term encounters, another for long term encounters. One person might prioritize his General Profile 1220 to search for long term encounter candidates in his local venue, and for short term encounter candidates (with perhaps different specifications) on his travel venues. In another example, a connoisseur of rare art, coins, or stamps, anticipating travel to a collector's convention in another part of the world, might broaden his potential encounter sphere to an international level while at the same time narrowing his specific interests or needs to only a few, very precise, commercial specialties. This is to avoid constant interruptions from less relevant encounters. In another case, where a teenage video game player might seek to hook up in the field with players he has only previously experienced in competitions online where that individual is known only by his online gaming "handle", a user would program those specific handles or player capabilities into his encounter profiles along with the lowest score level of individuals he is interested in meeting for game play or social encounters. This sort of programming would be exceptional at a video gaming convention where players have never met face to face or would physically recognize each other, but are aware of their competitive achievements. As online relationships continue to expand and mature, the benefits of MMx spontaneous encounters and the ability to get "into the heads" of others who share your innermost experiences, talents, hopes, or dreams become increasingly important and necessary to leading satisfying and productive lives.

In some instances, the MMx Network may detect an unusually strong code match between members in diverse or remote locations where spontaneous physical proximity encounters are not likely to occur. In such cases, and if so authorized by their users, the Network can, as a courtesy, advise those involved parties through its web site of such exceptional matches and offer them the option of using or purchasing this data so that they can pursue communications through traditional means. In this case, data collected at 1210, 1220, 1240, and 1260 will be processed by the MMx Central Controller 320, and distributed as shown at 160 in FIG. 1.

Once a member has opened an MMx account and has completed his basic "WHO I AM" and "WHAT I WANT" General Profiles, he is allowed to fill out Specific "WHAT I WANT" Profiles similar to those described in FIG. 5B at 1270, 1272, 1274, 1276, and 1278. These profiles are designed to format, encode, and process a user's specific interests and encounter expectations. Such profiles can, if desired, identify participating second and third party databases that would be used in searches for that member's encounter candidates. Some examples of these are shown at 220 in FIG. 1A and FIG. 5C. In a preferred embodiment, typical for early Personals/Dating encounters, one of these databases would likely become the user's "originating" database normally accessed by the user as shown at 105 in FIG. 1A. Such third party database owner/operators could be compensated by the MMx Network for any encounter in which their data was disclosed (at 500) during an actual encounter.

FIG. 5B shows five examples of Specific "WHAT I WANT" Profiles: a Personals/Dating Profile 1270, a Professional Networking Profile 1272, a Buyer/Seller Profile 1274, an Employment Profile 1276 and a Special Interest Profile 1278. As previously discussed, the methods and means for developing and assessing such Profiles are commonly known by industry professionals. Once completed and submitted in confidence by the MMx user, each profile element is encoded to match a precise encounter requirement and is then encrypted and returned to the user. This is performed for Personals/Dating at 1280, for Professional Networking at 1282, for Buyer/Seller at 1284, for Employment at 1286, and for Special Interest at 1288. Users can submit numerous such profiles in multiple categories. Once match encoding and encryption has been completed, the files can be transferred from the user's computer to his registered MMx mobile device as indicated at 170.

Another element of the MMx Profiling System is its Preference vs. Performance Reader 1290. This is a system component created to allow the MMx Network to learn more about the specific interests and habits of its users in order to offer those users a more rewarding and efficient service in the future. The Preference vs. Performance Reader monitors the way each user enables his Specific Search Profiles (1280, 1282, 1284, 1286, and 1288) and then compares the selected or requested content with actual in-field contact histories, which have been submitted at 192. By monitoring and documenting the way users request certain kinds of information, structure their prospective encounters, and then actually respond to them in the field (their acceptance, rejection or storage of encounter prospects, or engaging in actions that seem contrary to their stated objectives), the system Preference vs. Performance Reader 1290 will, over time, identify patterns of behavior that will allow the Network to suggest various options or possibilities to the user that could lead to more satisfying encounter experiences. Technically, this is achieved in much the same way that Amazon.com, for example, is able to suggest to certain purchasers other books or products on related subjects or in the way TiVo, over time, can learn a user's viewing habits and then recommend alternate programming of interest to that viewer. Using commonly accepted methods, this is accomplished by tracking the substance and content of factors which have previously led to successful encounters. If, for example, a user in a Personals/Dating "WHAT I WANT" Specific Profile consistently requests blond women, but due to other match criteria and circumstances, his downloaded Contact History 192 reflects a greater number of accepted and successful encounters with brunettes, then the Preference vs. Performance Reader 1290 will feed such new or contrary information (at 1292) to the MMx consumer through the MMx Central Controller, along with suggested changes or options that the customer may want to consider.

It is important to note that the MMx mobile product is intended to receive, store, and disclose CONFIDENTIAL information on its internal hard drive or in its solid state memory. However, unlike the ipod (and similar MP3 devices), the details, content, nature, control, and timing of such disclosures are unanticipated and are, at most times, even unknown to their users. ipods can download a limited number of times to a limited number of devices. By contrast, MMx can download unlimited amounts of data providing there are corresponding match codes. Finally, iPods are prevented from sharing information with other iPods, while MMx devices are intended to communicate, share, and exchange information between handheld units. Although such information will not include vital personal data (name, address, social security number, etc.), the information typically comprises a user's deeply personal, business, and lifestyle interests, and therefore must be protected from unwanted or unauthorized disclosure. MMx applications, such as Personals/Dating, deal with the release of data that is often private and confidential to its membership and, of course, proprietary to the original database's owners and operators. Military, intelligence, police, and criminal applications deal in even higher levels of information sensitivity and, as a result, demand even greater levels of information security.

MMx information can be stored, distributed and disclosed in at least two basic ways. In a first application, a user's NID Personal Profile (NID/PP) is stored in a fully encrypted format on the hard drive of his own personal MMx mobile unit, along with the Personal Data Codes (PDCs) necessary to match and decode other NID/PPs. Clearly, when an NID/PP is stored on an owner's hard drive, it must be transmitted wirelessly to another communicating MMx, and will therefore require greater transmission bandwidth than if only the PDC is transmitted, but this is not a critical limiting factor.

In a second application, the MMx system permits the Internet downloading of all NID Personal Profiles that match an individual's specific search criteria. These files are fully encrypted and are transferred via a user's personal computer to his MMx mobile device. Such downloads represent the full composite search results (CSRs) aggregated from all available participating databases and modified by the MMx Travel Planner 1260 in FIG. 5A. Using this application in the field, only PDCs are transmitted between MMx units. Once PDCs are matched, each MMx then simply decodes and displays, in predetermined protocol stages, the decrypted contents of its own hard drives on each respective screen. This application requires less wireless transmission bandwidth but involves greater onboard mobile memory; however, both approaches are entirely feasible with today's transmission and storage technologies.

With either application, the MMx mobile unit and its operation will be password protected and will likely include two further safety protections in the event a mobile unit is lost or stolen: (a) time-limited volatile memory (where the memory is automatically erased if a code is not input on a timely basis, and (b) a remote memory self-destruct (in which the MMx memory is erased upon hacking, tampering, or upon receiving an "erase" command when it next logs onto an MMx site). Such software security monitoring services are now commonly available for a fee and can also be incorporated into the MMx system.

Another aspect of the invention is the requirement for personal or proprietary information to not be released, shared, commingled, sold, or otherwise offered to competing databases or unauthorized consumers. One solution to this is to create a data distribution system in which NID/PP data files are never downloaded or stored in their entirety on a single MMx unit, thus rendering them ineffective for hacking should the unit become lost or stolen. Only when PDCs are precisely matched, through a pair of interacting MMx units in the field, would the necessary portions of a member's encrypted NID/PP become fully available, and thus, readable on the hard drive or memory of a single MMx device.

In practice, the encoded and encrypted data contained in an MMx memory is edited, added, deleted, or updated every time an MMx user connects his mobile unit 400 to the Internet via his home computer or through a local wireless network access point (NAP). If a user makes any significant change to his NID/PP, new Personal Data Codes are assigned. Users can modify their own NID/PPs in the field or from their home or office computers through the MMx web site, providing they input a valid User ID and Password. Modifications occur by changing previously submitted data or personal preferences contained in a user's Master, General, and/or Specific guided profiles, after which each entry is re-encoded and re-encrypted. Beyond this, the content of an MMx hard drive or SD memory is not normally accessible or viewable by the consumer. It only becomes so with a matching PDC, and then only during an actual proximity encounter under previously established protocols. Furthermore, each MMx is activated by a personal password. If this password isn't input properly or on a timely basis, depending upon the degree of security selected, the entire contents of the MMx hard drive could be erased. This protects each user against the unwanted MMx use or the disclosure of personal or proprietary encounter information.

Lastly, FIGS. 5B-5C reflect the uploading of information that has been collected in the field and stored on each MMx unit's hard drive. Such information remains encoded and is sent directly to the MMx Central Controller 320 via each user's computer and the Internet. At 1480, all confirmed viewed impressions—the verified playback of commercial video spots or page views, plus any consumer-initiated links to advertiser pages, information requests, or confirmed purchases—are verified against each user's account at Central Controller 320, and that information is subsequently forwarded for Media Billings at 1350. At 1580, all stored communications and interactions with and between fixed or moving objects, are uploaded to the MMx Central Controller. This includes all communications from other MMx units received during the broadcasts of user access codes between MMx handheld units in the field under the wireless protocols indicated at 500. At 1680, data relating to any and all confirmed interactions or communications between MMx mobile units and mobile or stationary video cameras or other types of digital devices such as measurement equipment—which has been stored in the memory of individual MMx units—is sent via the consumer's computer to the MMx Central Controller 320.

FIGS. 6A, 6B, and 6C depict the invention's Media Processing and Ad Distribution Model. The Media Processing section of the MMx Database System is shown at 1300. Step one in the process is the encryption of completed "WHO I AM" and "WHAT I WANT" profiles into their Non-Identifiable (NID) formats at 1280. They are then composed and assigned Special Interest User Codes at 1340. Although there can be a wide variety methods for attaching numerical user codes to incoming content in preparation for delivery, one very basic method is to apply a simple "who, what, when, where, how" formula to implement the process. In other words, at 1341, numerical values representing the basic nature of the seeking party define the "who" segment of this portion of the User Code. At 1342 and 1343, the general and specific nature of "what" that user is seeking defines that portion of the User Code. Such information can cover products ranging from the purchase or leasing of automobiles or homes to the buying of food, clothing, or services, all based on detailed profile specifics, together with that individual's precise demographics, psychographics, and related personal profiling. At 1344, Time Encoding can be attached to special content or data based on the historic movements and travel patterns of specific individuals. These "when" aspects of marketing or media buys can be interpreted to differentiate between a person who travels to work each day, the hours of travel, and the hours of work versus any relaxed time at home, dining hours, and similar criteria that would define a customer's use of time during the weekday or weekends. At 1345, Venue Encoding is translated into "where" criteria, whether a user spends more time at home versus in malls, schools, industrial, or office environments. Finally, the "how" criteria is attached to packaged User Codes at 1346. Priority Encoding is applied based on the relative importance of delivering one type of advertising impression over another, and is usually based upon the payment of a higher or lower fee for timely distribution. Priority Encoding could ensure, for example, that an ad for a downtown restaurant would not only be delivered to a consumer who desired that type of food, but also that such ads would be delivered to the consumer when he was in fact downtown (Venue Encoding), and immediately preceding his or her historic dining hours, to the exclusion of other types of paid ads which did not buy Priority Encoding. Also under "how" at 1347 is Determine Distribution Means, meaning delivery methods such as Internet, satellite, or wireless (further defined at 1400). Finally, at 1348, fees are calculated which represent charges to advertisers and others for the assignment of User Codes shown collectively at 1340, and the subsequent Scheduling of Unique Ad Content for delivery at 1360. Such fees are billed to member advertisers or others who utilize the MMx Database System for research or commercial advertising purposes, and this is indicated at 1350.

Scheduled Unique Ad Content is then forwarded via the MMx Central Controller 320 for distribution to the MMx user base as shown at 1380. When an MMx user logs on to his MMx community web site with his computer/modem 200, he will be presented with one or more specially prepared, personal ad pages, all of which reflect products, services, and opportunities that precisely match the interests, needs, and desires that the user has expressed in his "WHO I AM" and "WHAT I WANT" profiles. These are referred to as "Hyper-relevant Surprise Ad Pages" and are referenced at 1382. At 1384, the same hyper-relevant ad content, or slightly reformatted versions of it, can be distributed, if so programmed, directly to a user's MMx Mobile Device 400. Each user, of course, receives content based upon his "WHO I AM" and "WHAT I WANT" profiles. These can be resolved in many ways, both graphically and aesthetically, and may range from rich still photography to full motion video commercials that include links to other sites and options to purchase or order more information. Users are also given the opportunity to email videos and commercials which have been delivered to their personal sites to other friends and MMx users.

At the same time hyper-relevant ads and User Codes are distributed to MMx users, the same content can be disseminated to generate revenue in other applications, as shown at 1400. Included at 1420 is the distribution of content and User Codes to a wide array of vehicles and moving objects which are capable of displaying full motion video and/or reproducing audio sounds within their respective interior environments. Such objects include automobiles, trucks, taxicabs, commuter trains, busses, boats, aircraft, and numerous other types of passenger- or cargo-carrying conveyances. Such objects will be equipped with electronics packages having hard drives, processors, antennas, displays, and similar equipment designed to wirelessly receive, store, poll, and extract data to display ads and other types of information based upon the time of day, location, and movements relative to other objects in an environment. Once data and information is stored in such mobile objects, it can be transmitted between those moving objects or to nearby stationary objects for the purpose of media and content display, thus generating revenue by compensating the owners or operators of such platforms for their use.

At 1440, the distribution process is shown with respect to the receipt, storage, polling, and extraction of data and content to display hyper-relevant ads and other types of information by time of day and location on stationary objects within an environment for the purpose of generating revenue and compensating owners for the use of such fixed or stationary advertising platforms. Such objects would include many types of fixed, mobile, moving, portable, temporary, or permanent display surfaces such as billboards and signage, architectural structures, store fronts, glazing, interior and exterior walls, and the like. Such objects will be able to read incoming User Codes broadcast wirelessly from handheld MMx devices as well as from appropriately-equipped moving objects nearby. They would then interpret these codes as content requests, along with user preferences, in order to display immersive, full motion video hyper-relevant advertising, public service messaging, and other forms of communications to passing individuals and objects.

At 1460, Commercial TV Set top boxes, TiVos, DVRs, and similar in-home systems can be designed to use hard drives, processors, antennas, displays, display interfaces, audio systems, and similar equipment to wirelessly receive, store, poll, and extract data, enabling them to respond to content requests by displaying hyper-relevant ads and other types of information based upon the time of day, User Codes, and unique preferences for multiple family members and visitors to households who use MMx devices. An important feature of such set-top boxes allows them to instantly remove any advertisements which have been scheduled or broadcast on a general basis, and instantly and seamlessly replace them with hyper-relevant spots to be presented within the same broadcast time slot.

Importantly, and as indicated at 1500, MMx handheld devices are capable of communicating with moving objects 1420, with stationary objects 1440, and with commercial TV via special set-top boxes at 1460, that have been designed to receive content requests, and then poll and queue such content for display or, as in the case of set top boxes, substitute non-targeted scheduled content for stored hyper-relevant content. Each of these systems is able to document content deliveries by time, place, and User Codes which allows for performance feedback on at least four levels of consumer engagement: (1) did not view, (2) viewed, (3) viewed and heard, and (4) viewed, heard and responded to. In the latter engagement example, a motor vehicle or moving object may have changed its route to respond to a nearby location-based ad or promotion, or, within a predetermined passage of time, a user might complete a purchase, request information, or visit a geographic area which is directly related to the previous display of specific content.

The MMx system is further capable of crosschecking all content deliveries and content requests that are communicated within MMx or in independent systems. When these are later compared with claimed content impressions uploaded from in-field devices or from moving or fixed objects, it is possible to ensure against false distribution or false viewing claims as with so-termed "click fraud", which is increasingly found in the world of Internet advertising.

The distribution of hyper-relevant content to independent systems is further detailed at 1400 in FIG. 6C. Once Unique Ad Content has been scheduled at 1360, including its means of distribution at 1347, such content is distributed from MMx's Central Controller 320 via the Internet (cable, DSL), satellite, or wireless networks, or combinations thereof, as indicated at 1410, using electronic distribution infrastructures 1420 for receipt and distribution at a multiplicity of potential locations and environments. Included are direct distribution to single family residences and/or network access points (NAPs) in neighborhoods via the Internet, satellite or wireless networks such as WiMax (1421); the same for residences but to condominiums, apartment and mall complexes or parking garages (1422); direct distribution using the same infrastructures to office buildings, malls, retail stores and commercial, government or public service signage installations (1423); direct broadcast to busses, trains, fleet commercial and/or public transit routes, airports, train terminals, docks and major roadways (1424); direct broadcast to passenger vehicles on the highway via satellite, Internet NAPs or wireless such as WiMax, etc. (1425); direct distribution to special events such as concerts, competitions, theme parks, recreational or resort venues, beaches and public spaces, emergency or temporary sites 1426); direct to rural or remote locations such as outlaying towns or villages, rural highways, mountain, desert, beach or offshore locations (1427); or via other types of emerging and popular locations where mobile proximity communications or commercial communications is desired or necessary (1428). In FIG. 6C, diagram 1400 indicates an antenna 1429, depicting a wireless transmission point (a 2-way NAP or satellite downlink) for transmitting content, user codes, and delivery instructions to other mobile or stationary antennas. At 1430, a receiving antenna is indicated representing those typically found on moving objects at 1420, on stationary objects at 1440, or on commercial TV and set top boxes at 1460. Such antennas not only receive content, user codes, and delivery instructions, but also return encoded confirmations regarding the delivery of content by time and place along with accurate tracking information, all of which bears on consumer engagement.

Block 1500 in FIG. 6A indicates the wireless interaction between MMx units and various types of mobile or stationary objects at 1500. When individuals carrying MMx units pass by fixed objects (such as video signage or exhibitry), mobile objects (like automobiles, busses, cabs or trucks equipped with video displays), or various types of audience mass-monitoring devices (such as sensors dedicated to the measurement of encoded MMx transmissions), those users are able to be presented with highly personalized ad content and other types of information through displays on these objects, and the MMx entity is able to download and document large volumes of data relating to those presentations and to the individuals to whom they were presented. The MMx entity is also able to sell such information to researchers, planners, and participating advertisers. The wireless interaction between individual MMx handheld units and nearby mobile or stationary video cameras and other types of image and data capture devices is indicated at 1600. Such devices might be used for entertainment or recreational purposes and be located in unusual venues such as theme parks or ski resorts to capture and produce candid, automated movies of individual MMx users or entire groups of them. Such cameras can capture imagery continuously or they may be activated only upon receiving an encoded wireless signal from an MMx mobile unit within range of that camera. Alternatively, individual MMx units can transmit unique User Codes through which a portion of a continuous video capture is identified, and is then stored in accordance with the instructions contained in that transmitted code. In this way, a video movie could automatically be produced to include the images of any nearby MMx users in their surroundings. Such a movie can be further enhanced by automatically inserting establishing shots and audio sounds from the environment, captured from the same time period. The personal authorization for such image captures would be enabled by the encoded MMx transmissions. In this way, a guest attending a rock concert, for example, could authorize his MMx mobile unit to capture his candid image while he is part of the viewing audience and such images could then be automatically placed—having such approval—into a video production. Such imagery could also be time-stamped, encoded and sent to a remotely-located digital storage medium for that individual's later use.

In a similar manner, criminals or predators having proven convictions might be sentenced to wear modified versions of MMx units. Such devices could alert other MMx units nearby of that individual's presence, and would additionally permit the involuntary camera recording of that individual's movements within certain areas at certain times for the purposes of monitoring and law enforcement.

Finally, FIGS. 6A, 6B, and 6C reflect the wireless uploading of data relating to the in-field communications of devices that are designed to enable, measure, or confirm MMx user performance, movements, and activity. This information is transferred via the Internet to the MMx Central Controller 320, where it is then processed and can be later sold to advertisers or researchers as shown at 1390 in FIG. 1A and FIG. 6B. Such information remains encrypted to protect the security of the data and the privacy of the consumer. The uploading of data is indicated at 1480, confirming the in-field delivery and viewing of advertising impressions by MMx handheld devices. The uploading of data confirming the in-field communication between MMx units and fixed or mobile objects which have the ability to receive encoded signals from MMx units and then present content through video and audio means is reflected at 1580. The uploading of data confirming the in-field communication between MMx units and mobile or stationary video cameras and monitoring equipment in indicated at 1680. Such information is forwarded to the MMx Central Controller 320 and, as appropriate, to Media Billings at 1350.

MMx's ability to non-intrusively monitor its users—to collect and analyze their demographic makeup, their preferences and purchasing habits, their physical movements and their engagement with media and with each other—produces a cost-effective marketing and research tool like no other. Such levels of audience measurement have been previously achieved only by independent companies such as the Neilsen Ratings or Arbitron systems. These functions are now integral to the basic MMx product and service. However, as unique as MMx's ability to bring together consumers to share mutual objectives is, its most important feature is its capacity to invert the traditional process of commercial advertising. No longer must marketers push products under the noses of consumers while the consumer is doing other things. Instead—because it renders a novel service through two-step, in-depth profiling—MMx delivers exactly what buyers ask for at a time and place they want it.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer implemented method comprising:
   (a) compiling a general profile for a first user based on information provided by the first user about the first user, wherein the general profile does not include specific encounter criteria, and wherein the general profile is accessible by a mobile proximity device of the first user;
   (b) compiling a plurality of specific profiles for the first user based on information provided by the first user about the first user's specific encounter criteria, wherein the specific profiles are accessible by the mobile proximity device;
   (c) exchanging proximity communications between the mobile proximity device and one or more other proximity devices, wherein the general profile of the first user and the specific profiles of the first user are searchable by the one or more other proximity devices;
   (d) conducting a plurality of proximity searches among the one or more other proximity devices by evaluating the criteria of the plurality of specific profiles of the first user without evaluating the general profile of the first user for at least a second user who meets the criteria of one or more of the first user's specific profiles based on at least a portion of the second user's general profile or specific profile, wherein said searching includes evaluating the criteria of the plurality of specific profiles for the first user;
   (e) pairing the first user with the second user whose general profile or specific profile meets the criteria of one or more of the first user's specific profiles without evaluating the first user's general profile; and
   (f) displaying information about the second user to the first user based on said pairing, wherein a processor implementing a software program determines which of the first user's specific profiles is met in said pairing and selects a format for the display of the information from a plurality of potential formats based on which of the first user's specific profiles is met.

2. The method of claim 1 wherein the general profile is compiled based on information provided by the first user about the first user's desired account settings.

3. The method of claim 1 wherein a determination is made whether the second user meets the criteria of the one or more of the first user's specific profiles based on less than the entirety of the second user's general profile.

4. The method of claim 1 wherein the one or more other proximity devices is in an immediate vicinity of the mobile proximity device of the first user.

5. The method of claim 1 wherein a determination is made whether the second user meets the criteria of the one or more of the first user's specific profile based on a predetermined portion of the second user's general profile.

6. The method of claim 1 further comprising receiving, from the first user, one or more user-generated search text for a desired spontaneous personal electronic encounter and searching among the one or more other proximity devices for at least a second user who meets the user-generated search text based on at least a portion of the second user's general profile or specific profile.

7. The method of claim 1 wherein the one or more specific profiles identify participating second and/or third party databases that would be used in said searching.

8. The method of claim 1 wherein a plurality of specific profiles are compiled, said plurality of profiles belonging to multiple categories.

9. The method of claim 8 wherein the multiple categories include one or more of the following: personals/dating, employment, buyer/seller, or special interest.

10. The method of claim 1 wherein the one or more specific profiles or the contents of the one or more specific profiles are prioritized.

11. The method of claim 1 wherein the information about the second user is displayed to the first user on the mobile proximity device of the first user.

12. The method of claim 1 further comprising displaying hyper-relevant information to the first user based on said first user's general profile.

13. The method of claim 12 further comprising receiving a response to the hyper-relevant information from the first user and updating the first user's general profile with the response.

14. The method of claim 13 further comprising generating and displaying subsequent hyper-relevant information based on said updated first user's general profile.

15. The method of claim 14 wherein the hyper-relevant information is an advertisement.

16. The method of claim 1 further comprising displaying hyper-relevant information to the first user based on said first user's one or more specific profiles.

17. The method of claim 1 wherein said displaying of information depends on a display permission provided by the second user.

18. The method of claim 1 wherein said compiling the general profile or the one or more specific profiles comprises conversion of data in said general profile or said one or more specific profiles to a non-identifiable (NID) format; and uploading said NID-formatted content to a central server, wherein analysis of said NID-formatted content influences the display to the first user.

19. The method of claim 18 further comprising converting the NID format into one or more special interest user codes which influences the display to the first user.

20. The method of claim 1 wherein the general profile includes information about the first user's potential future locations.

21. A computer implemented method comprising:
   (a) compiling a general profile for a first user based on information provided by the first user about the user, wherein the general profile does not include specific encounter criteria, and wherein the general profile is stored in one or more databases and is accessible by a device of the first user;
   (b) compiling a plurality of specific profiles for the first user based on information provided by the first user about the first user's specific encounter criteria, wherein the specific profiles stored in the one or more databases are accessible by the device;
   (c) conducting a plurality of searches among the one or more databases by evaluating the criteria of the plurality of specific profiles of the first user without evaluating the general profile of the first user for at least a second user who meets the criteria of one or more of the first user's specific profiles based on at least a portion of the second user's general profile or specific profile, wherein said searching includes evaluating the criteria of the plurality of specific profiles for the first user, and wherein the general profile of the first user and the specific profiles of the first user are searchable by one or more other devices;
   (d) pairing the first user with the second user whose general profile or specific profile meets the criteria of one or more of the first user's specific profiles without evaluating the first user's general profile; and (e) displaying information about the second user to the first user based on said pairing, wherein a processor implementing a software program determines which of the first user's specific profiles is met in said pairing and selects a format for the display of the information from a plurality of potential formats based on which of the first user's specific profiles is met.

22. The method of claim 21 wherein the general profile is compiled based on information provided by the first user about the first user's desired account settings.

23. The method of claim 21 wherein a determination is made whether the second user meets the criteria of the one or more of the first user's specific profiles based on less than the entirety of the second user's general profile.

24. The method of claim 21 wherein a determination is made whether the second user meets the criteria of the one or more of the first user's specific profile based on a predetermined portion of the at least one other user's general profile.

25. The method of claim 21 further comprising receiving, from the first user, one or more user-generated search text for a desired spontaneous personal electronic encounter and searching among the one or more databases for at least a second user who meets the user-generated search text based on at least a portion of the second user's profile.

* * * * *

UNITED STATES PATENT AND TRADEMARK OFFICE
CERTIFICATE OF CORRECTION

PATENT NO. : 9,299,077 B2  
APPLICATION NO. : 11/552932  
DATED : March 29, 2016  
INVENTOR(S) : Curtis M. Brubaker Page 1 of 1

It is certified that error appears in the above-identified patent and that said Letters Patent is hereby corrected as shown below:

Page 1, item (73) Assignee: please delete "VIE, INC." and replace with --V!E, INC.--

Signed and Sealed this  
Fifth Day of July, 2016

Michelle K. Lee  
*Director of the United States Patent and Trademark Office*